(12) United States Patent
Bennison

(10) Patent No.: US 11,895,225 B2
(45) Date of Patent: Feb. 6, 2024

(54) SYSTEMS AND METHODS FOR TRUSTWORTHY ELECTRONIC AUTHENTICATION USING A COMPUTING DEVICE

(71) Applicant: James E. Bennison, Oakton, VA (US)

(72) Inventor: James E. Bennison, Oakton, VA (US)

(*) Notice: Subject to any disclaimer, the term of this patent is extended or adjusted under 35 U.S.C. 154(b) by 0 days.

(21) Appl. No.: 17/864,258

(22) Filed: Jul. 13, 2022

(65) Prior Publication Data
US 2023/0155812 A1    May 18, 2023

Related U.S. Application Data

(62) Division of application No. 17/530,136, filed on Nov. 18, 2021, now Pat. No. 11,405,189.

(51) Int. Cl.
*H04L 9/08* (2006.01)
*H04L 9/06* (2006.01)

(52) U.S. Cl.
CPC .......... *H04L 9/0825* (2013.01); *H04L 9/0656* (2013.01); *H04L 9/085* (2013.01); *H04L 9/0866* (2013.01)

(58) Field of Classification Search
CPC ..... H04L 9/0825; H04L 9/0656; H04L 9/085; H04L 9/0866; H04L 9/083; H04L 9/3213; H04L 9/3231; H04L 9/0861; H04L 2463/082; H04L 63/0807; H04L 63/0861; H04L 63/0876
See application file for complete search history.

(56) References Cited

U.S. PATENT DOCUMENTS 1,310,719 A   7/1919  Vernam
5,221,838 A   6/1993  Gutman et al.
(Continued)

OTHER PUBLICATIONS

Chen, Lily, NIST Special Publication 800-56C Recommendation for Key Derivation through Extraction-then-Expansion, "Computer Security", Nov. 2011, pp. 1-17.
(Continued)

*Primary Examiner* — Philip J Chea
*Assistant Examiner* — Sangseok Park
(74) *Attorney, Agent, or Firm* — Birch, Stewart, Kolasch & Birch, LLP

(57) ABSTRACT

A method, system, and digital recording medium provides for convenient and trustworthy user authentication with a computing device combining four authentication factors through use of a remote authentication system (RAS). An identity token (Device-ID) cryptographically bound to the user's computing device is generated as a first authentication factor. A password known only to the user is a second factor. Cryptographic signatures generated from the user's biometric minutiae is a third factor. A random challenge received from the RAS is a fourth factor. An encryption key-generation key is created cryptographically using the Device-ID and stored locally, which together with the user's cryptographic signatures are encrypted with a one-time-pad encryption key obtained from the RAS on a communication channel different from that used for other communication between the device and the RAS to provide perfect secrecy, then transmitted from the device to the RAS on a connection therebetween to register said shared-secrets.

12 Claims, 9 Drawing Sheets

(56) References Cited

U.S. PATENT DOCUMENTS

| | | | |
|---|---|---|---|
| 5,745,576 | A | 4/1998 | Abraham et al. |
| 8,296,562 | B2 | 10/2012 | Williams et al. |
| 8,694,856 | B2 | 4/2014 | Tuyls et al. |
| 9,338,006 | B2 | 5/2016 | Headley |
| 9,425,954 | B1 | 8/2016 | Chalker |
| 9,680,812 | B1 | 6/2017 | Emaminouri et al. |
| 10,046,834 | B1 | 8/2018 | Lindblade et al. |
| 10,367,805 | B2 | 7/2019 | Chen |
| 10,630,682 | B1 * | 4/2020 | Bhattacharyya .... H04L 63/0869 |
| 2007/0140530 | A1 | 6/2007 | Coogan et al. |
| 2009/0169070 | A1 | 7/2009 | Fadell |
| 2011/0087611 | A1 | 4/2011 | Chetal |
| 2012/0209749 | A1 | 8/2012 | Hammad et al. |
| 2013/0254858 | A1 | 9/2013 | Giardina et al. |
| 2013/0265136 | A1 | 10/2013 | Wadia |
| 2017/0318011 | A1 * | 11/2017 | Yoo ....................... H04L 9/3228 |

OTHER PUBLICATIONS

Federal Information Processing Standards Publication, FIPS Pub 201-2, "Personal Identity Verification (PIV) of Federal Employees and Contractors", Aug. 2013, pp. 1-87.

Ferraiolo, Hildegard et al., Draft NISTIR 7981, "Mobile, PIV, and Autentication", Mar. 2014, pp. 1-14.

Grassi, P.A. et al., NIST Special Publication 800-63-3, "Digital Identity Guidelines", Jun. 2017, pp. 1-74.

Grassi, P.A. et al., NIST Special Publication 800-63C, "Digital Identity Guidelines, Federation and Assertions", Jun. 2017, pp. 1-49.

Grassi, P.A., et al., NIST Special Publication 800-63A, "Digital Identity Guidelines", Jun. 2017, pp. 1-47.

Grassi, P.A., et al., NIST Special Publication 800-63B, "Digital Identity Guidelines, Authentication and Lifecycle Management", Jun. 2017, pp. 1-79.

Grother, P. et al., NIST Special Publication 800-76-2, "Biometric Specifications for Personal Identity Verification", Jul. 2013, pp. 1-61.

Payment Card Industry (PCI) Data Security Standard, PCI Security Standards Council, "Requirements and Security Assessment Procedures", Version 3.2.1, May 2018, pp. 1-139.

* cited by examiner

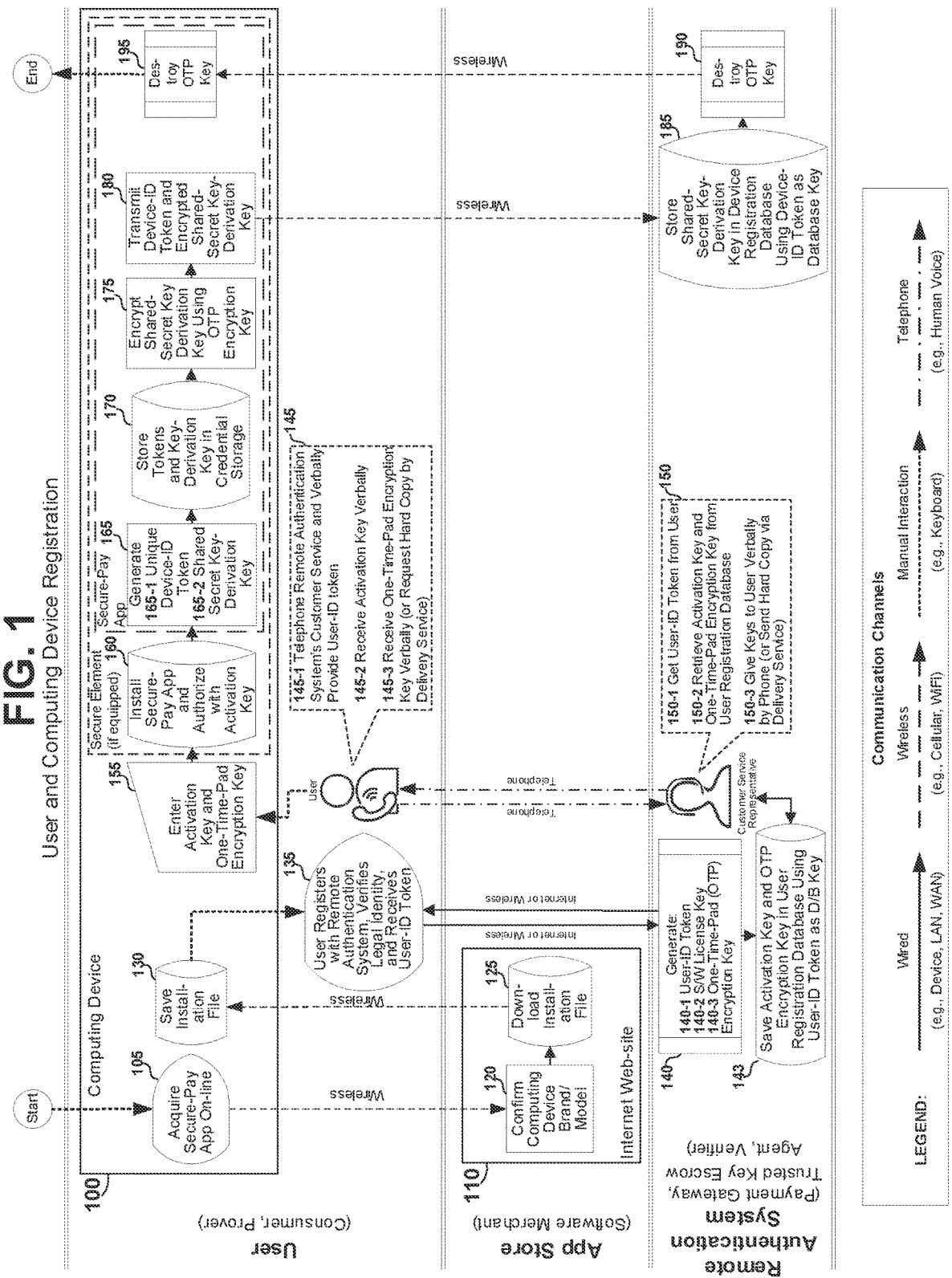

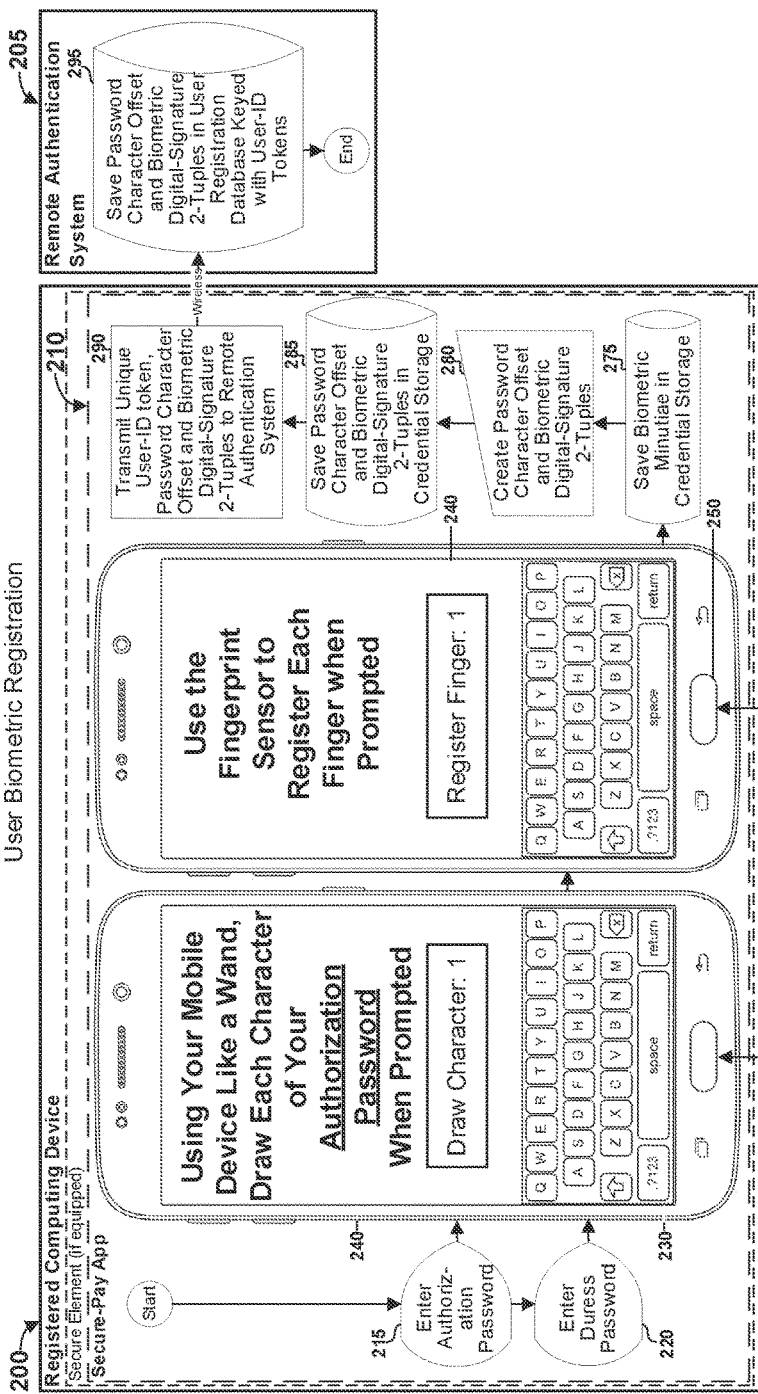
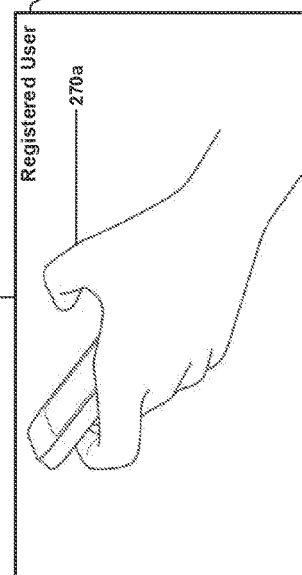
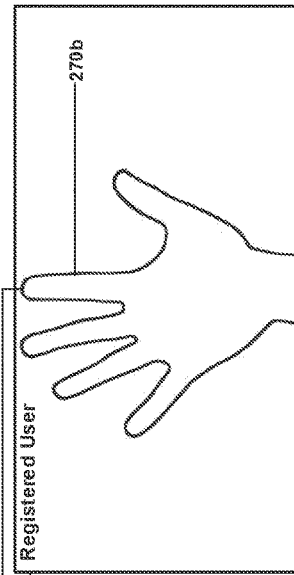

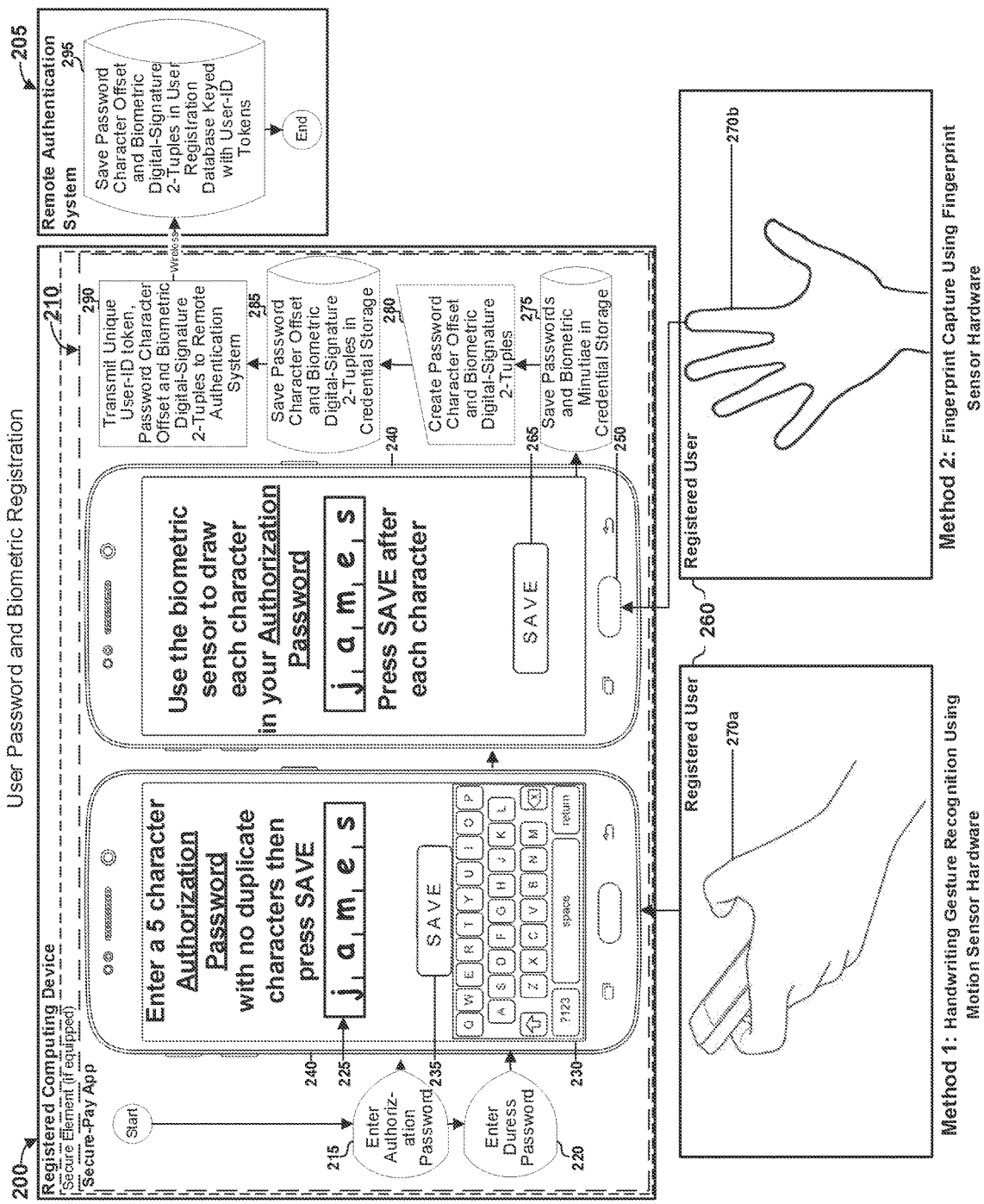

FIG. 3
Payment Credential Registration
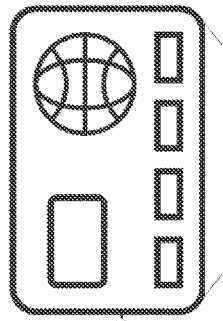
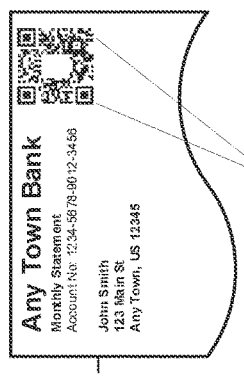
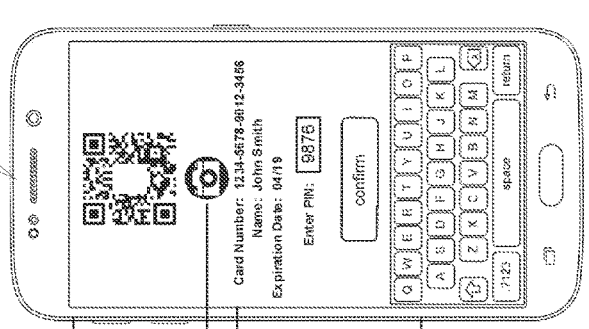

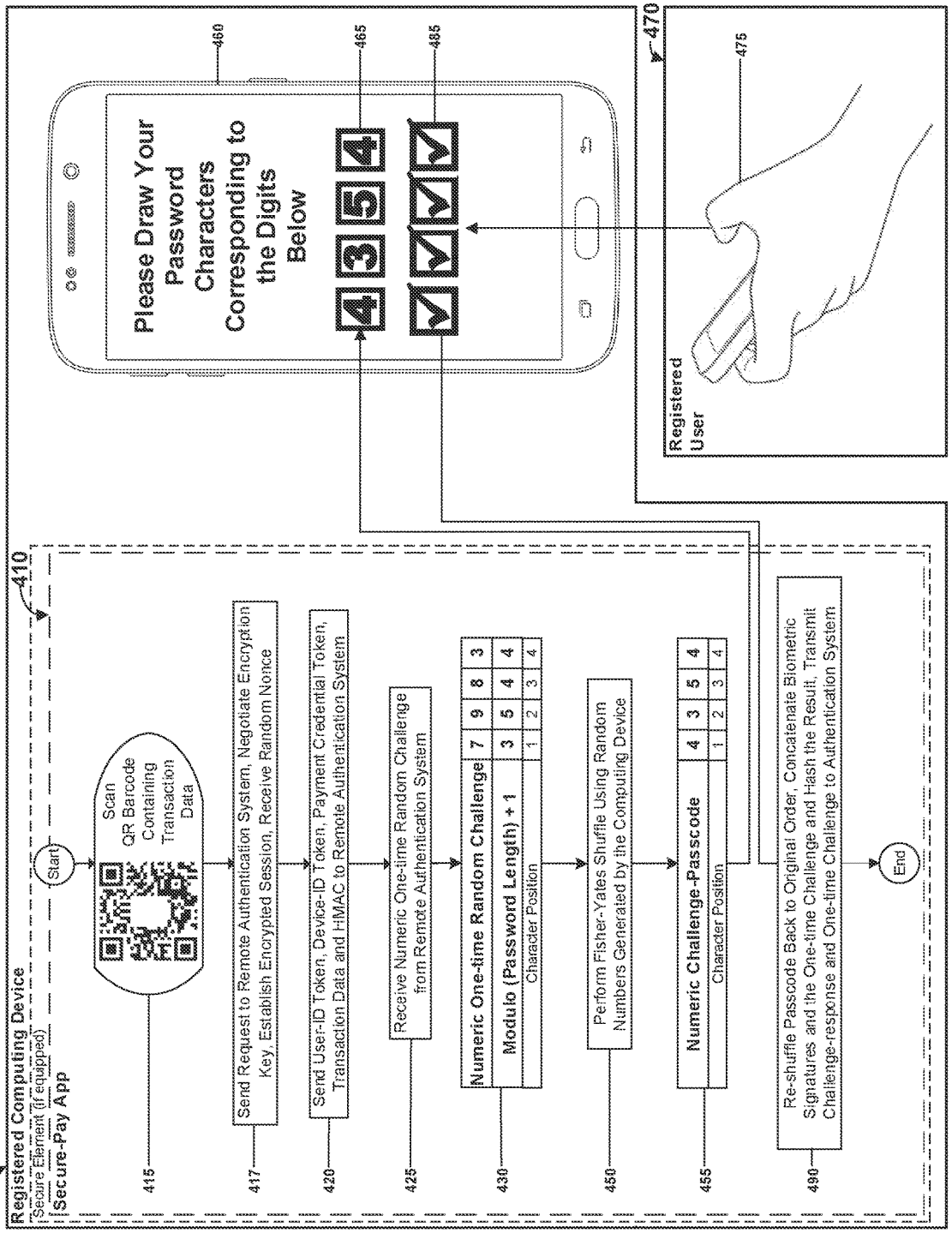

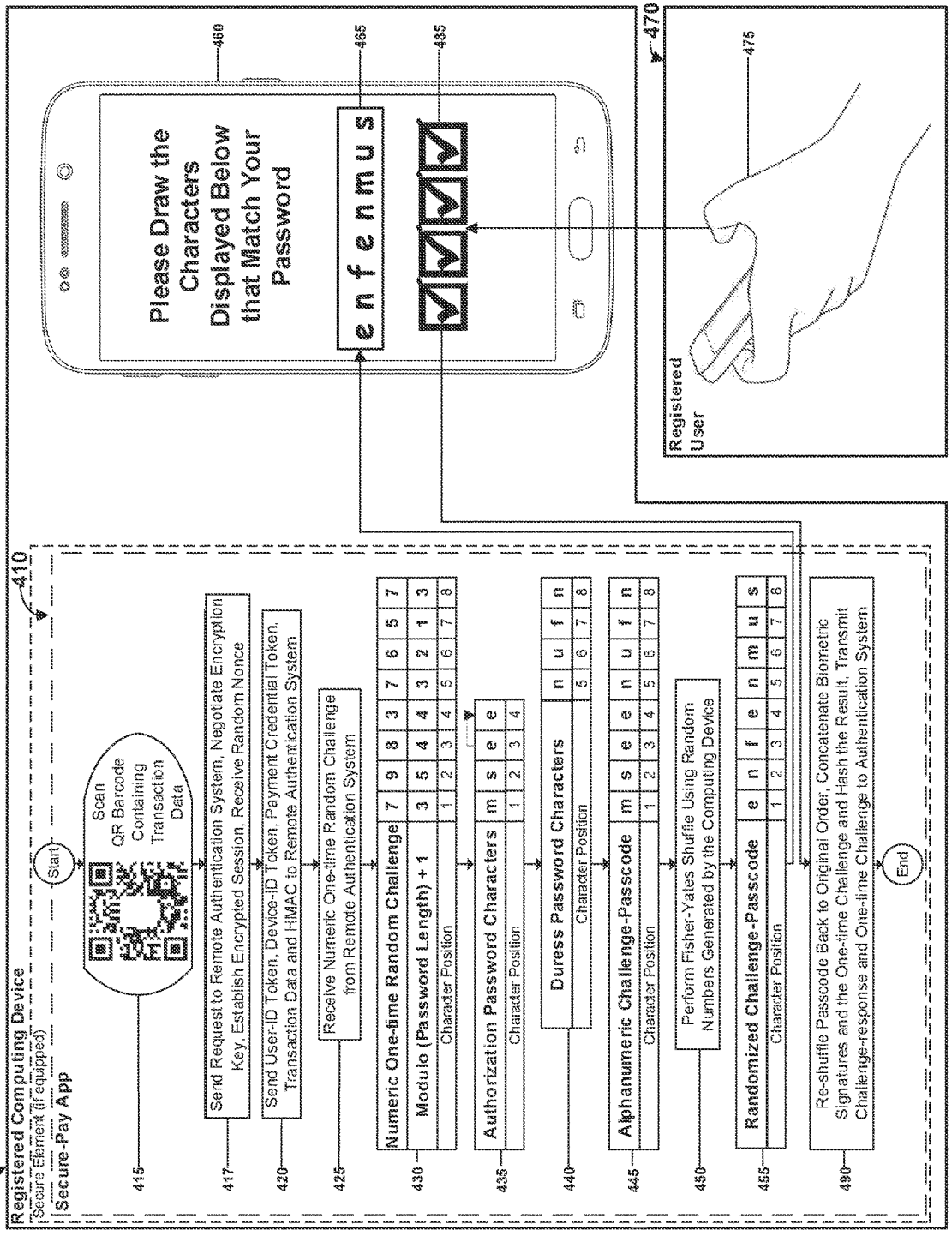

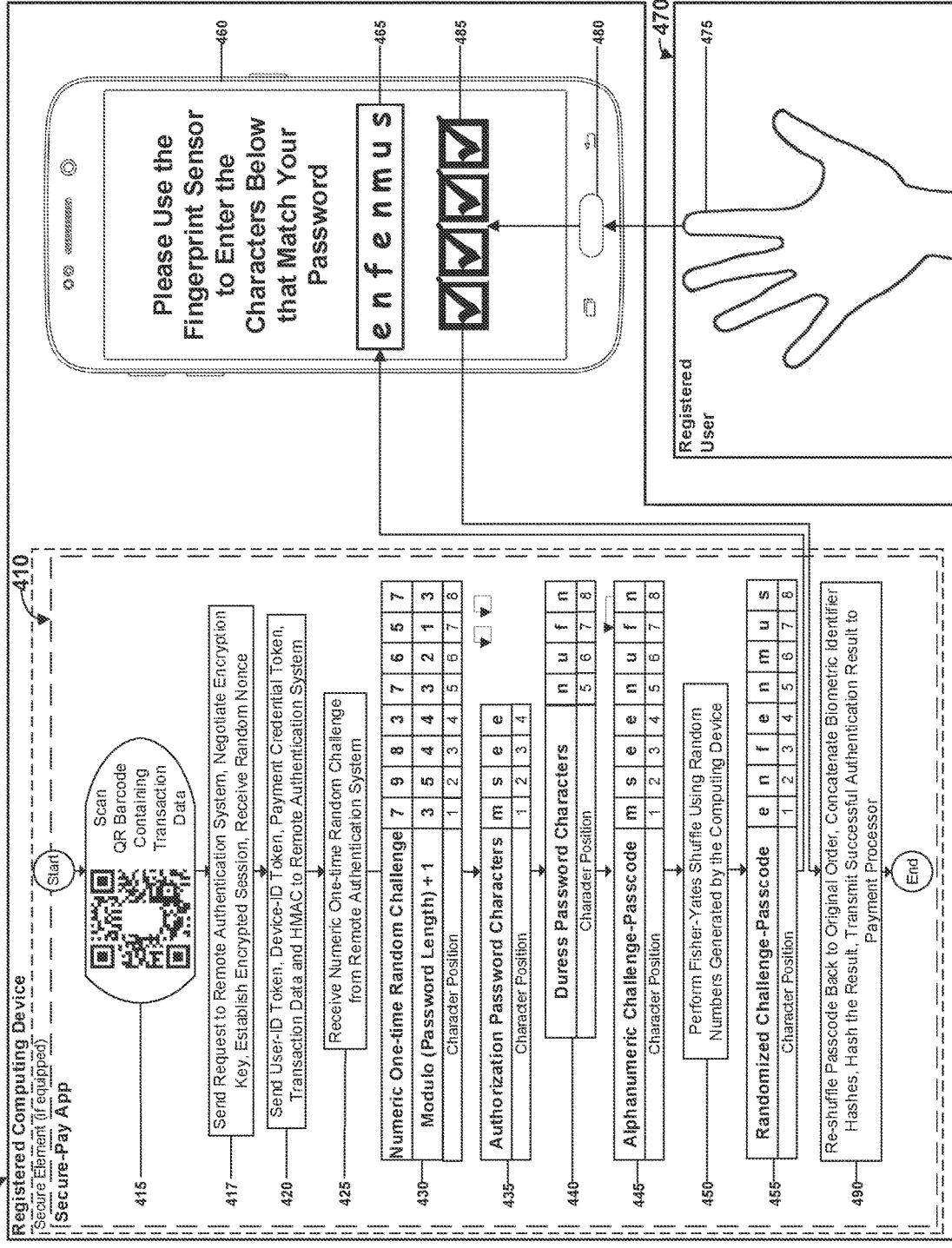

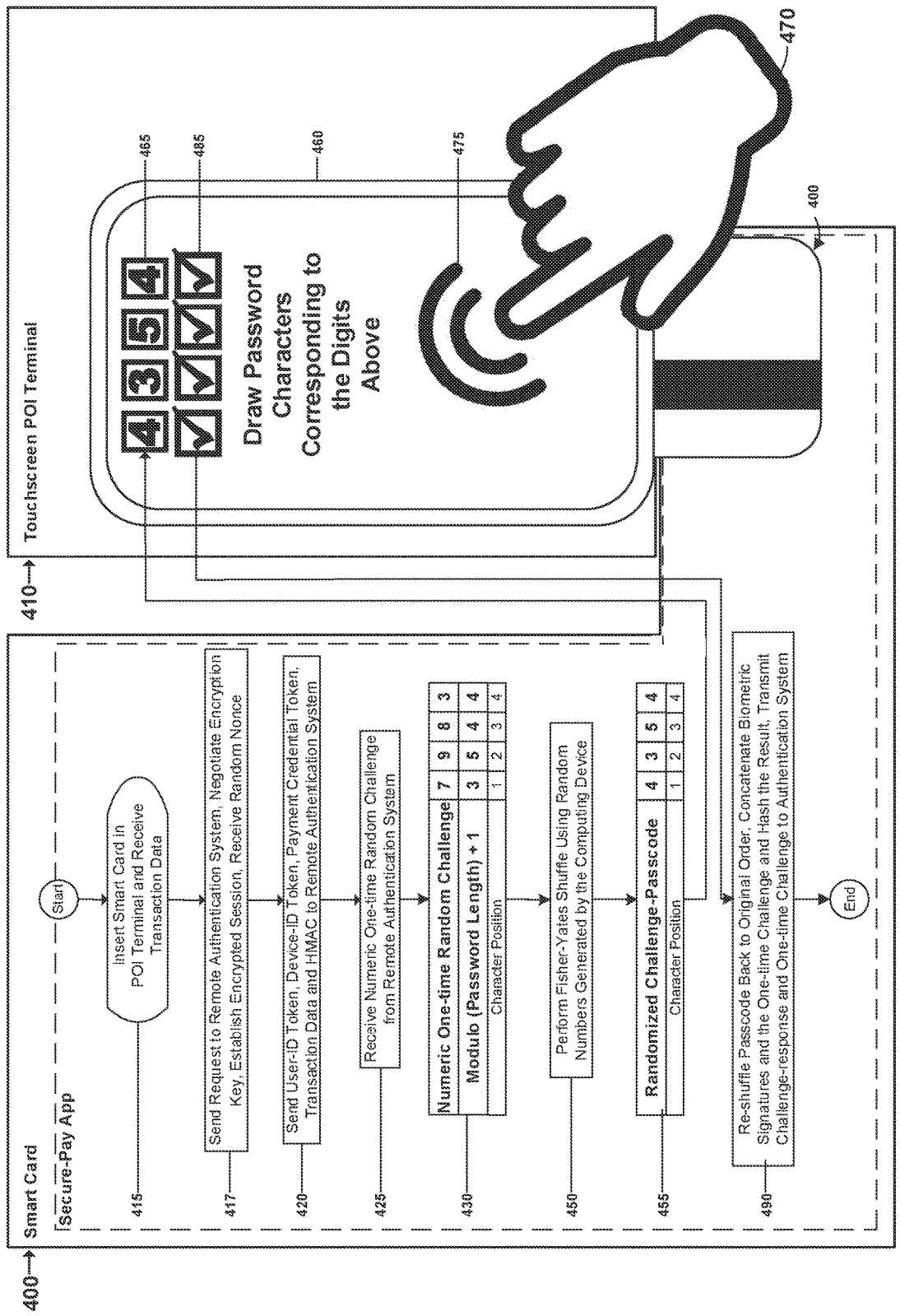

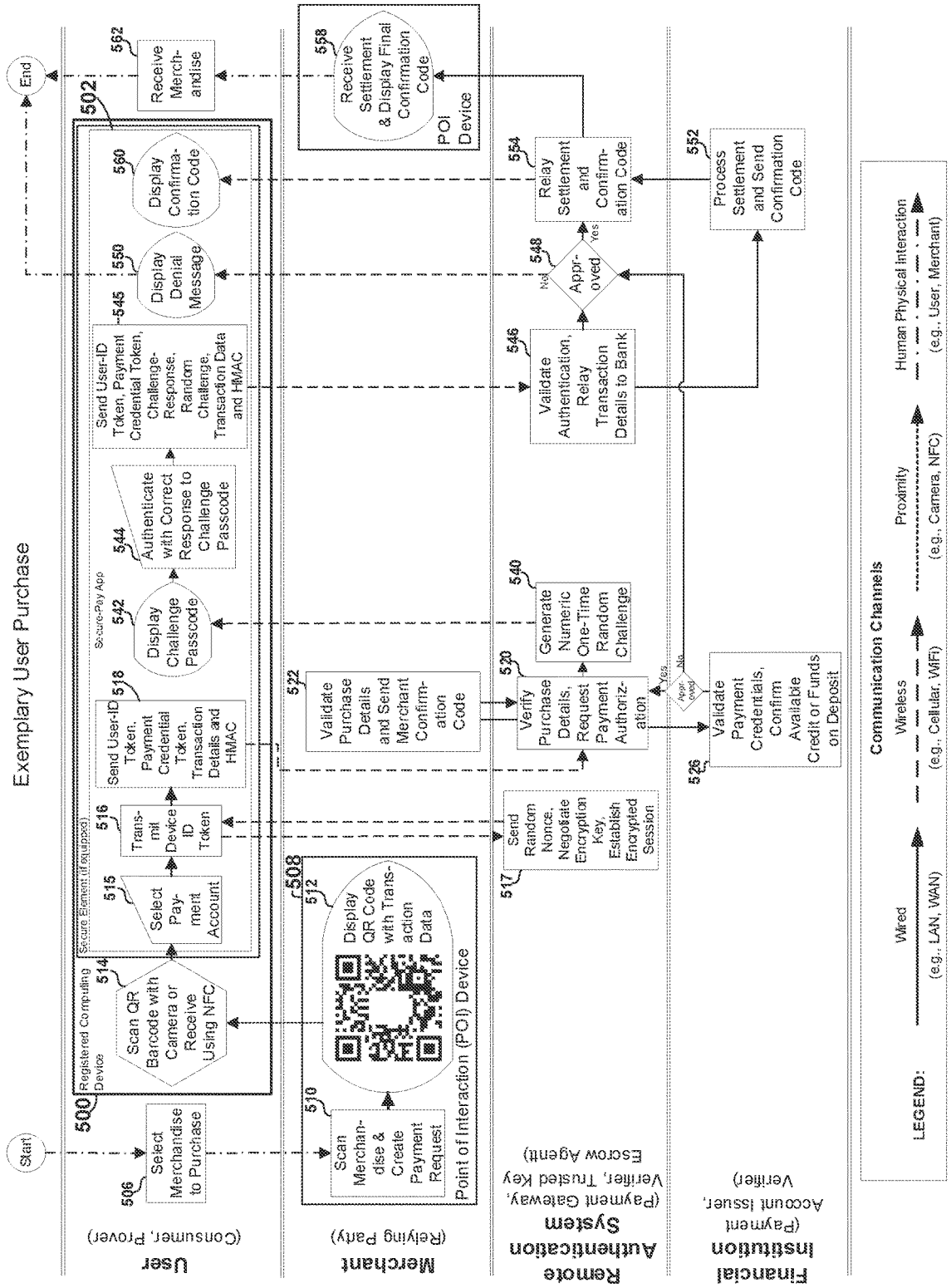

SYSTEMS AND METHODS FOR TRUSTWORTHY ELECTRONIC AUTHENTICATION USING A COMPUTING DEVICE

CROSS-REFERENCE TO RELATED APPLICATIONS

This application is a Divisional of co-pending application Ser. No. 17/530,136, filed on Nov. 18, 2021, which is hereby expressly incorporated by reference into the present application in its entirety.

FIELD OF THE INVENTION

The present application is directed to trustworthy systems and methods for simplified electronic identity verification using multi-factor authentication plus a dynamic-element, particularly for use in electronic payment systems in an e-commerce environment.

BACKGROUND

In the world of electronic commerce (hereafter referred to as e-commerce) there is a payment transaction processing environment where there are a rapidly increasing number of attacks on the e-commerce system-of-systems that results in losses of many billions of dollars annually as a result of fraudulent and counterfeit transactions. Greater than 75% of all cyber fraud results from the compromise of digital identity credentials, and the majority of e-commerce transactions in the United States are still dependent on obsolescent digital identity technologies such as magnetic stripes on credit cards, debit cards, gift cards, and the like (hereafter referred to as payment cards) that contain the user's payment credentials, a technology dating back to the 1960s that is still use today but which has proven to be highly vulnerable to fraud. Methods like writing down the credit card number, expiration date, and security code from the back of the card by fraudsters such as servers in restaurants when they take the card out of the customer's line of sight requires nothing more high-tech than a pencil and paper to defeat the card security, and one shopping mall clerk in Japan was recently arrested for using his photographic memory to steal over 1,300 credit card numbers and use them to make purchases on-line. In the e-commerce environment, the increasing popularity of the on-line transaction environment which compels the use of the "card not present" payment model that relies only on the physical numbers on the payment card, has had the consequence of exponentially increasing the opportunity for fraud using such stolen or cloned payment card credentials.

Recently a more modern two-factor payment card technology has become available called chip-and-PIN, a system first adopted in Europe under the Europay, MasterCard and Visa (EMV) global standard, which allows the user to enter a secret Personal Identification Number (PIN) as the second identity factor defined by the U.S. National Institute of Standards and Technology (NIST) Special Publication 800-63-2 (SP 800-63-2) Electronic Authentication Guidelines. However, the fraudsters have even developed ways to defeat this more secure solution; chip-and-PIN was first successfully compromised using cryptanalysis by exploiting a vulnerability in its pseudo-random number generator, and more recently fraudsters have figured out many ways to defeat or circumvent it, including a method to rewrite the magnetic stripe on the chip-and-PIN card to make it appear like a chipless card and bypass the protection provided by the chip altogether. More recently fraudsters developed methods where chip-and-PIN cards could be cloned inexpensively using purloined credentials, and have even created a malicious Java app that can be installed on any card that is compliant with the EMV standard which will respond that the PIN is valid no matter what number was entered.

Fraudsters have also managed to develop devices that are dubbed "skimmers" or "shimmers" which are stealthy readers surreptitiously inserted between the merchant's card reader and the payment card to eavesdrop and steal payment credentials from magnetic stripe as well as chip-enabled payment cards. Scanners that are legal and can be bought in regular electronics stores can steal the credential information from the RFID chips embedded in "contactless payment" cards when the card passes within the proximity of a wireless "shimmer", and can harvest the information from all the payment cards the user is carrying without detection. Recently the practice of installing card readers on gasoline pumps has given fraudsters increased opportunities to tamper with unattended card readers, and they have upped their game by developing an electronic shim that has microelectronics surreptitiously installed in a cable that can be inserted between the card reader and PIN pad to capture credentials, and to avoid detection they have even equipped them with Bluetooth capability that allows the fraudster to retrieve this information wirelessly by just walking near the pump with their smartphone.

This and other attacks of escalating sophistication and frequency on vulnerable or substandard implementations of various cryptographic schemes or security factors that chip-and-PIN and other two-factor authentication systems that current payment methods rely on will continue to give fraudsters an ever-increasing advantage in exploiting weaknesses in virtually every one and two factor authentication payment technology currently in use. The U.S. National Retail Federation (NRF.com) said in a position paper that "There is no single solution to the complex issue of criminal hacking and we know PIN and Chip is just a bridge on the long road to a safer payment system".

A second order impact of adoption of the PIN and Chip technology is that it has increased the work effort for fraudsters to compromise in-person e-commerce transactions and caused them to shift their activities to the card not present on-line e-commerce ecosystem. To try and counter this shift, the U.S. National Institute of Standards and Technology (NIST) Special Publication 1800-17 Multifactor Authentication for E-Commerce recommends stronger authentication solutions for on-line transactions. However, the solutions offered require users to obtain and use special hardware (e.g., YubiKey NEO Security Key) that is not interoperable with the PIN and Chip hardware solution used for in-person transactions, and require additional authentication steps in addition to entering the payment card credential information, further complicating the user experience and increasing the authentication time as well as cost.

Currently, there is no secure way for online transactions using a browser on a computing device to assert your identity and prevent anyone else from asserting it across the Internet that can satisfy NIST's multi-factor authentication standards. Authentication solutions are available (e.g., Google Verification) that operate by sending a one-time verification code via SMS to a mobile phone that the user then enters into their browser, but these are actually "two step" verification methods that do not qualify as "two-factor" authentication under the NIST 800-63-2 guidelines, and have been compromised by fraudsters so frequently that NIST no longer recommends using them.

Many on-line services are offering other two-factor authentication solutions, and the most secure options use a hardware token that independently generates a one-time code for the user to enter. But even the most secure of these token solutions has been hacked, RSA Security's hardware token solution was allegedly hacked by a nation-state that then used it to access a large defense contractor's network to steal design data for the latest DoD stealth fighter. Also, the fraudsters have discovered a method for stealing the RSA software token registered to a computing device and then hacking the RSA SecurID Software Token application to allow it to run on another computing device, thereby counterfeiting both of the users' two authentication factors.

Recently manufacturers have introduced the next generation mobile smart-phones which have biometric sensors capable of delivering the "something that you are" third authentication factor in multi-factor authentication as defined in the NIST SP 800-63-2 Electronic Authentication Guidelines. For example, Apple Inc. and Samsung introduced fingerprint sensors on their iPhone™ and Galaxy™ models. Unfortunately, fraudsters continue to refine their tradecraft and within two weeks after the iPhone was introduced they developed a method requiring very low work effort which can overcome the default "single fingerprint" authentication method used by fingerprint equipped smart-phones by substituting a copy of the end-user's fingerprint fabricated using commonly available materials such as a plastic transparency, a laser printer, and skin-tone latex milk. The vendors continue to improve the accuracy of the fingerprint sensors to overcome these vulnerabilities, but the fraudsters quickly improve their tradecraft to counteract every improvement. In a more recent hack, within one day of the release of the latest smart-phone, the fraudsters captured a picture of a user's fingerprint from a wine glass and using a 3D printer and software available on-line they counterfeited the fingerprint to unlock the device. In most cases the user's fingerprints are already present on their lost or stolen smart-phone, in which case it becomes trivial for fraudsters to lift the fingerprint and use this method to impersonate the user and unlock the phone.

In another clever attack, a child used her mother's finger while she was napping to unlock her smartphone and go on a shopping spree. After Mercedes introduced an S-class sedan that was protected by a fingerprint recognition system, police in Malaysia are still hunting for members of a violent gang who chopped off a car owner's finger to get around the vehicle's hi-tech security system in order to steal it. University researchers have even created an experimental fingerprint "master key" exploit that is able to spoof 23% of the subjects in the fingerprint dataset, which could cause losses of a magnitude that would bankrupt the e-commerce community if utilized by fraudsters at scale.

More recently Samsung released a smart-phone with facial recognition as the biometric identity mechanism, and it took undergraduate student researchers less than a week to figure out that a picture of the user from his Facebook page displayed on another smartphone could be waved in front of the camera to fool it into authenticating, and when Apple released the latest iPhone with facial recognition authentication it took less than 5 days to defeat it using masks printed on a 3D printer. These examples demonstrate that current implementations of single factor biometric authentication are so unsecure and hacking them is so trivial that in some cases even a 6-year-old can figure out how to defeat them. Because of the ease with which static physical biometrics like fingerprints and facial scans can be counterfeited with such low-tech methods, the European Payments Council (EPC) has stated that single fingerprint verification is not sufficient to meet their requirements for the third identity factor unless a dynamic element is added, e.g., a random dynamic challenge-response method was also required. The EPC published a Mobile Payments white paper (EPC492-09) further stated " . . . DPA (Dynamic Passcode Authentication) may be used for remote card transactions".

In addition, flawed, missing or weak implementations of security controls by device manufacturers are frequent, such as reports that one smart-phone manufacturer stored customer fingerprint data unencrypted in an easily accessible image file on the devices, and other Android smart-phones that have been found to contain similar vulnerabilities. Another disadvantage of static physical biometrics such as fingerprints, hand geometry recognition, iris scans, facial recognition and others is that once the biometric is compromised it cannot be changed like a password can. In 2014 the US Government's Office of Personnel Management (OPM) was hacked and 5.6 million cleared employees' fingerprints were stolen, which may eventually show up for sale on cybercrime dark-web sites making it easy for fraudsters to impersonate those static physical biometrics and challenge the legitimate owners' ability to use their own biometric identities. Another disadvantage of static physical biometrics is that the user can be manipulated by fraudsters to authenticate when they are asleep, rendered unconscious, incapacitated, fingers amputated or even dead. Further, some static physical biometrics are possible to clone with low work effort due to flawed or weak implementations by vendors as the above described vulnerabilities demonstrate.

Many banks see mobile authentication as the way of the future for on-line banking and ATM transactions. Several banks have installed ATMs that can dispense cash using a mobile device without requiring a payment card. However, the early implementations of "cardless transactions" suffered fraud losses because they still rely on one-factor or weak two-factor authentication methods using mobile devices that can be easily defeated by fraudsters as described herein. Experts agree that identity-proofing remains the weak point in mobile banking.

There is another trend gaining momentum for retailers to go "cashless", accepting only payment cards or electronic payments. Retailers and banks are joining this trend because the cost of handling cash exceeds the cost of electronic transactions. However, state and federal legislators are concerned that this discriminates against low-income people, many of whom don't even have a bank account.

Another use-case for improved authentication methods that are not subject to these mobile device vulnerabilities are pilot programs being conducted in at least six states to develop digital drivers' licenses that require more trustworthy identity assurance solutions than the current state-of-the-art technology can deliver.

Currently there is no two-factor authentication method that cannot be hacked by fraudsters with relatively low work-effort, making a persuasive case that adoption of three or more factor authentication is the only feasible security solution for the future of high-assurance authentication.

There are significant problems that these evolving security measures have not been able to overcome; fraudsters have bypassed the need to compromise individual payment credentials altogether by attacking a more high-value target in the e-commerce environment; the merchants' payment processing systems where billions of users' payment credentials are transmitted, processed and stored before, during and after the payment processing cycle. One Russian-speaking criminal enterprise whose signature attack method involves installing malware on Point Of Sale (POS) systems has exploited hundreds of merchants and captured millions of card numbers and is earning as much as $50 million dollars a month. This and other recent high profile compromises such as the loss of tens of millions of payment card numbers in the T.J. Maxx, Heartland, CardSystems, Inc., Home Depot, Target, J.P. Morgan Chase and Marriot data breaches among others demonstrate the most obvious vulnerability with the present e-commerce payment system; which is that millions of virtual and physical merchant locations across the globe that transmit, process and store these outdated payment card credentials cannot adequately secure their infrastructure, gateway, POS and back office systems—exposing a huge attack surface for the fraudsters to exploit. Further exacerbating this problem is the recent trend of consumers to register their credit or debit card credentials with frequently used on-line merchants to expedite check-out, or storing them in their web browser, exposing even more payment credentials to theft from these vulnerable merchant systems. There are collectives made up of cyber criminals that have compromised large portions of the e-commerce infrastructure using 'formjacking"; attacks that work by installing virtual "credit card skimmers" on poorly secured web-sites by secretly inserting a few lines of malicious code such as JS (JavaScript) sniffers designed to intercept users' input on these compromised websites to steal the users' bank card numbers, names, addresses, login details, and passwords in real-time.

The most successful attack vector used by fraudsters is spearphishing, sending e-mails with links to malicious web sites they control and using "social engineering" to trick users into entering their payment credentials. Lack of user awareness of this threat is what makes this hack so profitable, and experts agree that technical controls to protect the payment credentials are the only practical solution, rather than trying to educate users with the unrealistic intention of fixing human gullibility. Another technology on-line merchants are using to secure payment and other transaction systems is the Completely Automated Public Turing test to tell Computers and Humans Apart (CAPTCHA) method where the user has to identify pictures of objects correctly to prove they are a human and not an automated bot. However, researchers have developed advanced analytics that can actually solve CAPTCHAs with even higher accuracy than humans, effectively rendering that authentication method obsolete. Unfortunately for consumers, media reports say the actual expenses from the recent and high-profile breaches such as Target and Home Depot amount to less than 1% of the affected company's annual revenues, and after reimbursement from cyber insurance and tax deductions, the losses are even less. This demonstrates that the financial incentives for companies to invest in greater information security are low, and even suggests that they may not be financially motivated to deal with the credential theft problem if the cost of fixing it exceeds the unreimbursed cost of their losses.

Another latent vulnerability in the current e-commerce data transmission systems is that they rely on security mechanisms such as SSL and TLS which depend on asymmetric-key cryptography (i.e., public key infrastructure or "PKI" systems). The Fast IDentity Online (FIDO) Alliance has also published a mobile device authentication standard that relies entirely on asymmetric-key PKI as well as static physical biometric methods. However, the long-term viability of current asymmetric-key cryptosystems will put the e-commerce environment at significant risk when quantum computing becomes available at some time in the future. The advent of quantum computing will make it practical to perform factorization of large integers rendering such asymmetric-key encryption systems vulnerable. Symmetric-key encryption systems (e.g., encryption systems using long-term shared-secret encryption keys) of sufficient key lengths are not considered to be vulnerable to known quantum computing attacks and are therefore considered by cryptography experts at the National Institute of Standards and Technology (NIST) and the National Security Agency (NSA), the US Government's cryptography authorities, to be the best long-term solution. Another alternative involves encryption using One-Time-Pad (OTP) keys derived from a Vernam cypher to create high-entropy encryption keys which can produce provable perfect secrecy. In fact, according to cryptography experts any cryptosystem with perfect secrecy must use OTP-like key structures to be resistant to cryptanalysis and brute force attack. Even quantum computers will have zero impact on OTP-based cryptosystems.

There is also the age old low-tech, or no-tech, vulnerability of thieves stealing paper bills out of the mailbox that have the user's financial credentials printed on the bill. Unbelievably, users still think that writing their credit card number, expiration date, and security code on a paper bill and then affixing their signature to it to authorize payment; then putting that piece of paper in a tissue-thin envelope, sealing it with spit, and depositing it in a tin box on the street with no lock on it is secure enough to protect this sensitive information. Further complicating the problem, governance for e-commerce transaction processing is spread across many organizations and countries, e-commerce industry standards around the world include the U.S. Payment Card Industry (PCI) Data Security Standard (PCI-DSS), the PCI Payment Application Data Security Standard (PCI PA-DSS), the European Payments Council (EPC) mandatory guidelines, the United States' Federal Financial Institutions Examination Council (FFIEC) guidelines, as well as various other international regulatory requirements and guidelines that should be adhered to in order to provide a sufficient level of security for trustworthy e-commerce transactions. An impediment to improving electronic authentication for secure computer system access and secure facility access is the technical difficulty of getting current solutions to comply with commercial standards and best-practices and United States government standards for multifactor authentication methods such as those defined by the U.S. National Institute of Standards and Technology (NIST) Special Publication 800-63-2 (SP 800-63-2) Electronic Authentication Guideline which defines multi-factor electronic authentication, and the draft National Institute of Standards and Technology Interagency Report (NISTIR) 7981 for Mobile, PIV, and Authentication recommendations.

DESCRIPTION OF RELATED ART

Recently some more modern electronic payment technologies have been developed that provide improved security by using two-factor authentication methods such as the chip-and-PIN system in use in Europe which relies on payment cards that have an embedded processor chip which require a specially equipped payment terminal to read the payment certificate on the chip and require entry of a Personal Identification Number (PIN) by the authorized user in order to authorize the transaction, satisfying two factors, "something you have" and "something you know". The payment card industry in the United States has recently been implementing a similar technology, however, a significant percentage of card issuers are not requiring PIN numbers to be entered as the second factor, instead they are using a "chip and signature" system, but current technology does not easily allow the authenticity of the signatures to be verified at the time of sale like a PIN number, therefore the chip and signature method is actually not taking advantage of the available second authentication factor, thereby only providing the assurance level of single-factor authentication. As a result, the current chip-and-PIN implementation only protects the payment credential embedded on the card's chip from electronic theft or interception during transmission, but does not prevent theft and subsequent fraudulent use of stolen or counterfeit payment cards. Other two-factor authentication technologies to improve the security of e-commerce transactions which have had limited success include Verified by Visa, MasterCard SecureCard, American Express SafeKey, Stratos Card and JCB International J/Secure that require additional hardware and/or the use of a PIN to authenticate transactions. MasterCard has created a credit card with an embedded processor and a fingerprint sensor that can be used with European chip-and-PIN systems.

More recently, mobile device applications such as the Google Wallet, Pay Anywhere and the like have been developed with improved security features including PIN authorization. Even more recent payment card security technologies are exemplified by the Visa Dynamic Passcode Authentication pocket sized chip-and-PIN card reader with a keypad and display and the Visa CodeSure and MasterCard Securecode payment cards which are chip-and-PIN credit cards with built-in keypads and LCD displays which are a new class of mobile solutions that can generate one-time dynamic verification codes to perform off-line purchase authorizations. Apple Computer has developed ApplePay™ and Samsung has developed Samsung Pay™ which provide single fingerprint static physical biometric two-factor authentication when using their mobile devices. However, all of these newer technologies have had limited market adoption largely because they require proprietary hardware or software, rely on proprietary mobile platforms such as Apple iPhone or Samsung Knox, or require specialized and expensive payment devices or cards and/or point of sale hardware; and as a result, the user inconvenience, high complexity and cost of such solutions has inhibited rapid and wide-spread adoption. The U.S. National Institute of Standards and Technology (NIST) Special Publication (SP) 800-63-2 Electronic Authentication Guidelines defines the three factors of multi-factor authentication as " . . . something you know, something you have, and something you are". The NIST guideline further states that "The strength of authentication systems is largely determined by the number of factors incorporated by the system. Implementations that use two factors are considered to be stronger than those that use only one factor; systems that incorporate all three factors are stronger than systems that only incorporate two of the factors". The most significant limitation to a secure payment system is the fact that these newer technologies typically still rely on only one or two of the three possible factors of the "multi-factor authentication" method, however, there is no current solution in widespread use in the e-commerce ecosystem that employs more than one or two identity factors. Since all current PIN verification methods such as chip-and-PIN card systems and mobile wallet applications still rely on only one, or at most two, of the three possible authentication factors, they provide less than the maximum possible security protection required by the NIST 800-63-2 guidance to provide provably trustworthy authentication, and even the implementation of mobile payment applications that require a fingerprint use a weak implementation that is subject to the "single fingerprint" vulnerability noted by the European Payments Council above, and still provide only two of the possible three authentication factors because they rely on a single fingerprint in lieu of the password as the second factor.

Current security controls and payment processing solutions that rely only on usernames and passwords/PINS suffer from numerous disadvantages as well. In another attack on passwords and PINs, by taking advantage of new technologies researchers have shown an eavesdropping attack using Google Glass or any video equipped device to record a user entering their password or PIN and then using a custom algorithm to decipher the user's secret passwords, thereby compromising the second authentication factor in an inexpensive, repeatable and scalable manner. Fraudsters have also developed "skimmers" and "shimmers" that can be inserted in the ATM's card slot along with miniature cameras to capture the card data and user PIN, and have even used infrared heat sensors to scan the keypad on ATM machines after a user enters their PIN, and by analyzing the heat intensity patterns on the keys can not only detect not only which keys were pressed, but which order they were pressed, thereby creating simple to use and inexpensive methods to surreptitiously capture the user's password or PIN. Another researcher has created a system that employs the user's own biometrics to defeat security by using the motion detectors in a smart-watch to sense a PIN number as it is typed into a keypad.

Methods for two-factor authentication that send a one-time PIN number to a user's smartphone using the short message service (SMS) protocol (e.g., text message) to authenticate are in widespread usage, but SIM swapping attacks where the fraudster takes over control of the user's phone number, or installs malware on the smartphone, or compromises the network carrier's Signaling System 7 (SS7) telephony protocol to have the PIN also sent to their phone, thereby allowing the fraudsters to intercept the one-time PIN and log-on to the legitimate user' account. For that reason, NIST has announced that certain two-factor authentication methods using mobile devices have been deprecated and may no longer be included in future releases of their Electronic Authentication guidance. Even secure communication protocols used by financial institutions such as the Society for Worldwide Interbank Financial Telecommunication (SWIFT) protocol have been successfully compromised. Fraudsters, notably some advanced persistent threat actors called the Lazarus Group (aka Hidden Cobra) associated with a rogue nation-state, have stolen hundreds of millions of dollars from financial institutions around the world by successfully compromising the outdated SWIFT authentication protocols dating back to the 1970s using social engineering, phishing attacks and backdoors to impersonate legitimate bank employees authorized to approve electronic funds transfers. Even more concerning is the rapid development of "deep fake" technologies that can impersonate humans. One recent example was development of artificial intelligence-based software to mimic the voice of a corporate CEO, including mimicking his slight German accent, to successfully fool his own employee into making a fraudulent electronic funds transfer. Fraudsters and cyber-crime syndicates are investing in R&D to develop new technologies to advance their tradecraft, expand their attack vectors and increase their profits. Apple, Inc. introduced the ApplePay™ mobile app for their iPhones™ and iPads™ which uses the built-in fingerprint reader to provide two-factor user authentication (i.e., possession of the mobile device plus a static physical biometric), however it is still subject to vulnerabilities, notably the fingerprint fabrication vulnerability described above. In addition, ApplePay™ requires Near Field Communication (NFC) hardware to be installed at every merchant's point of sale system, thereby slowing adoption.

Recent technological advances in security for smart-phones (e.g., Apple iPhone™ Samsung Galaxy™, LG Pro) as well as other mobile devices have appeared on the market making it possible to create leap-ahead high-assurance mobile payment processing systems and methods including that which is disclosed herein. The next-generation mobile devices including smart-phones typically come equipped with a new generation of processors that have hardware enforced security architectures, for instance, the newest generation of mobile device processor chips include features like the Security Element (SE), which is an example of a modern mobile hardware platform of the type exemplified by the Cortex-ATM CPU chip marketed by ARM Holdings which contains a hardware enforced "TrustZone™". Other manufacturers have analogous features on mobile CPU chips such as the Secure Processing Unit (SPU) in the Snapdragon 855 chip marketed by Qualcomm, and the "Knox" security architecture on Samsung mobile devices. These next-generation mobile processors provide an isolated secure processing environment which the European Payments Council (EPC) Mobile Payments white paper endorsed by saying "usage of a Secure Element (SE) in the mobile phone which hosts a (dedicated) authentication application could be a considerable enhancement with respect to user convenience". Newer smart-phones also include immutable device-unique hardware identifiers which are asserted to be unclonable that can support device-level hardware-enforced root-of-trust authentication and encryption methods.

For older devices that do not include an immutable hardware-enforced unclonable device-unique key, technologies such as Confidentio™ by Intrinsic-ID, Inc. (described in U.S. Pat. No. 8,694,856 B2) uses manufacturing differences in SRAM memory chips to create an unclonable unique device identity (device-ID) token, or by Sandia Labs (described in provisional patent application No. 62/175,753) and called Quasi-Physically Unclonable Digital ID (Q-PU-DID).

The Federal Financial Institutions Examination Council's (FFIEC) published guidance recommends the use of "complex device identification" that employs methods that do not easily permit the fraudster to "impersonate the legitimate customer". The mobile devices equipped with these unclonable device-unique keys can support authentication methods meeting the FFEIC complex device authentication standard, thereby ensuring the user is in possession of the authentic device which can satisfy the first factor of three-factor authentication as defined in NIST 800-63-2; "something you have". The immutable device-unique key can also provide unclonable device and software layer root of trust capabilities by enabling secure loading of software signed and encrypted by the verifier using this immutable device-unique hardware key which can only be unlocked at run-time, thereby ensuring hardware enforced secure boot of trusted digitally-signed software that provides hardware-enforced tamper resistance to prevent infection with malware. Most mobile devices also are equipped with one or more hardware devices such as accelerometers, gyroscopes, g-meters and geomagnetic sensors that can detect changes to the orientation and acceleration of the device along three axes to perform gesture recognition, along with fingerprint readers, any combination of which could be used to capture the user's unclonable biometric third factor to provide trustworthy authentication compliant with NIST 800-63-2 and other guidelines.

The fraudsters will continue to advance their tradecraft to attack vulnerabilities in current and future one and two-factor authentication systems. Most alarmingly, consumer adoption of security technologies has been slow because studies have pointed to the fact that consumers prefer convenience over security, and also are not willing to pay additional for security technologies.

OBJECTIVES AND BENEFITS

The embodiments described herein overcome some or all of the disadvantages described above in the BACKGROUND and DESCRIPTION OF RELATED ART sections of the present application. The embodiments of the present application exhibit some or all of the following advantages achieved in accordance with the teachings of the present application.

An advantage of the disclosed embodiments is that they may improve upon electronic authentication by using multiple user authentication factors combined cryptographically to bind the user, their device, their password and their biometric identity and furthermore adding a dynamic numeric one-time random challenge, thereby significantly increasing the security strength and trustworthiness of the identity verification method compared to the prior art. An advantage of the disclosed embodiments is that they may present three identity factors; the user's possession of the device, the user's secret password and the user's biometric identity factors plus a random dynamic factor combined into a single challenge-passcode where the user can respond with the fewest number of actions mathematically possible, thereby maximizing speed, convenience and ease of operation. A further advantage is that the identical method can be used in all transaction modalities including in-person, on-line, telephone ordering, printed bills, automated vending, etc.

An advantage of the disclosed embodiments is that they can utilize existing computing devices (e.g., mobile devices) as the "something you have" authentication factor without requiring users to carry additional specialized hardware (e.g., chip-and-PIN card, One-Time-Password generator, USB key).

An advantage of the disclosed embodiments is that they may improve on the authentication using a "zero knowledge proof" method for the password to be validated by the remote authentication system, thereby providing mathematically provable proof of identity while not requiring the actual password or biometric to be transmitted over untrusted networks.

An advantage of the disclosed embodiments is that they may utilize a behavioral dynamic biometric authentication method that is cryptographically bound to the users' digital identity, thereby providing mathematically provable high levels of assurance that the asserted electronic identity belongs to the person who is asserting it as opposed to someone attempting to pose as another.

An advantage of the disclosed embodiments is that they may utilize a challenge-response including a dynamic random factor in addition to traditional three-factor authentication, thereby thwarting fraudsters' ability to impersonate biometric authentication or intercept and record authentication sessions and launch "replay attacks".

An advantage of the disclosed embodiments is that they may utilize a behavioral dynamic biometric method of handwriting stylometry or gesture recognition which overcomes vulnerabilities inherent in static physiological biometrics such as fingerprints, iris scans or facial recognition which can be counterfeited by fraudsters with relatively low work effort to authenticate by forging the user's "proof of identity". A further advantage is that they may employ a method to recover from the loss or theft of static physical biometrics (e.g., fingerprints lost in the previously discussed OPM breach), as well as preventing such attacks from succeeding in the future, by providing a method for replacing compromised biometrics by allowing the user to easily change their password characters and corresponding biometric digital signatures.

An advantage of the disclosed embodiments is that they may overcome the vulnerabilities in static physiological biometrics that allow authentication even when the user is not present, unconscious, incapacitated or dead, thereby increasing the trustworthiness of the electronic authentication by providing "proof of life" in addition to "proof of identity".

An advantage of the disclosed embodiments is that they may thwart scenarios such as theft by armed robbery, hostage taking and coercion by providing a "duress password" that can be used to activate a silent alarm or other mitigation action, thereby providing added protection and safety from such criminal activities.

An advantage of the disclosed embodiments is that they may offer a "duress password" in addition to the "authentication password", which provides a safe and discrete method for the user to decline authentication, whereby it provides "proof of intent" in addition to the three authentication factors, thereby strengthening the authentication and non-repudiation security properties by establishing that "informed consent" was given by the user at the time of authentication.

An advantage of the disclosed embodiment is that they may provide "multi-step" authentication, as opposed to "multi-factor" authentication, including payment card number, expiration date and Card Verification Value (CVV) for "card not present" transactions by using a high-assurance three-factor remote authentication method, thereby exceeding compliance with NIST 800-63-3 A, B, and C Electronic Authentication Guidelines, PCI-DSS, EuroPay and EPC standards for "card present" transactions.

An advantage of the disclosed embodiment is that it may provide mutual four-way authentication between the user (consumer, prover), the merchant (relying party), the remote authentication system (trusted key escrow agent, trusted middleman), and the user's bank (financial institution), which provides resistance to Man-In-The-Middle (MitM), Man in the Browser (MitB) and/or URL redirection attacks where one of the parties is dishonest or impersonated by a fraudster.

An advantage of the disclosed embodiments is that they may utilize tokenized user account credentials, instead of passwords transmitted in the clear, that are only valid if authorized using the disclosed electronic authentication method employing the user's biometric multi-factor plus a dynamic factor, thereby minimizing the vulnerability for loss, theft and unauthorized use of payment credentials by fraudsters who compromise merchants', financial institutions' or trusted escrow agents' payment processing systems.

An advantage of the disclosed embodiments is that they may transmit users' payment credentials and transaction data in an independently encrypted session over the mobile device's wireless network rather than the merchants' networks, which constitutes an "out-of-band" processing channel instead of using the merchants' insecure networks, thereby significantly increasing fraudsters' work effort and cost to capture and decrypt the traffic.

An advantage of the disclosed embodiments is that they may utilize "defense in depth" of combined methods including 1) a randomized challenge-passcode, 2) displaying only the digits corresponding to secret password characters and not displaying the password characters themselves, 3) using only part of the user's secret password making it impossible to derive the full secret password from observing a single authentication sequence, 4) entering the password using biometric minutiae capture, and 5) using a computing device that remains in the possession of the user during and after authentication significantly increases the work effort required for an eavesdropping fraudster to intercept the challenge-passcode and decode it, thereby thwarting proximity eavesdropping attacks.

An advantage of the disclosed embodiments is that they may combine a behavioral dynamic biometric electronic authentication method with a dynamic challenge-response method thereby thwarting vulnerabilities used by fraudsters such as installing simple key-loggers or other data capture malware on the computing device or browser to capture static credential data such as usernames, account numbers, CVV numbers, and passwords/PINS.

An advantage of the disclosed embodiments is that they may enable an air gapped transmission of the transaction data to the user's computing device (e.g., scanning a QR code, using Near Field Communication (NFC)) which does not require direct physical contact with the ATM or payment terminal keyboard, thereby minimizing the risk of contracting bacterial or virus borne illnesses.

An advantage of the disclosed embodiment is that they may enable an air gapped transmission of the transaction data to the user's computing device (e.g., scanning a QR code, using Near Field Communication (NFC)) which does not require payment devices which come in contact with the ATM or merchant's payment card terminal, thereby thwarting card "skimmers" or "shimmers" placed on ATMs or payment card terminals by fraudsters.

An advantage of the disclosed embodiment is that they may utilize continuous user identification solutions employing temporal biometrics including touch and movement behavior by adding the "something you know" factor requiring a password, thereby eliminating the vulnerability that when the device is authenticated by the legitimate user and is then lost or stolen, a fraudster can use the pre-authenticated device for a period of time to conduct unauthorized activities.

An advantage of the disclosed embodiments is that they may utilized for any transfer of assets between any category of payer and payee including merchants, individuals, financial institutions, governments, proprietorships, companies, corporations, LLCs, non-profit organizations, or any other entity.

An advantage of the disclosed embodiments is that they may prove the identity of the user with high-assurance (i.e., NIST 800-63-3 Level 3 or 4) for access to assets such as secure computer systems, building entry systems, transportation systems such as airline check-in, voting systems, military weapon systems including multi-party control solutions, and others. An advantage of the disclosed embodiments is that they may be used to support any payment modality including: in-person (e.g., brick and mortar stores), card-not-present (e.g., web-based), e-mail (e.g., Pop-Money, Zelle, PayPal, Venmo), paper-based (e.g., bills received by US mail), wire transfers, or any other payment transaction type.

An advantage of the disclosed embodiments is that they may be used for transactions between a payer and a payee involving the payee's assets held in any financial instrument, whenever the fiduciary (e.g., credit card issuer, bank, financial institution) requires high-assurance authentication, thereby proving that the payment is authorized by the account's legal owner or authorized trustee.

An advantage of the disclosed embodiments is that they may be used for electronic asset exchange methods such as electronic bill-pay, bank-to-bank wire transfer systems such as Automated Clearing House (ACH), Society for Worldwide Interbank Financial Telecommunication (SWIFT) or others that require high-assurance authentication to prove that the asset transfer is authorized by the financial instrument's legal owner or authorized trustee.

An advantage of the disclosed embodiments is that they may support any currency type or denomination that is represented by a numerical value, whether physical, electronic or barter exchange, that requires transferring assets between financial accounts that are connected to the e commerce environment.

An advantage of the disclosed embodiments is that they may support"cashless" payment methods while allowing people to pay electronically where cash is not accepted.

An advantage of the disclosed embodiments is that they may support allowing people, even people without bank accounts, to deposit cash directly to the secure-pay app in order to pay electronically.

An advantage of the disclosed embodiments is that they may revoke electronic payment token credentials and reissue credentials more rapidly and at a low cost and impact to the user and the environment.

An advantage of the disclosed embodiments is that they may utilize quantum-immune symmetric-key encryption as the long-term cryptographic method combined with quantum-resistant or quantum-safe cryptographic algorithms in order to be "quantum-ready" as recommended by NIST, NSA and other cryptographic standard-setting organizations. It should be noted that symmetric-key cryptography with key lengths of 512 bits or more are considered by cryptographers to be quantum-immune for the foreseeable future.

An advantage of the disclosed embodiments is that they may be implemented on most computing devices in use today such as smart-phones or other mobile devices that have trusted biometric sensor(s), a trusted display for user interaction, and a trusted camera for optical capture/scanning of Quick Response (QR) codes or a trusted NFC capability or equivalent, thereby making it possible to provide high-assurance multi-factor authentication using device(s) that most users already own and without requiring merchants to invest in additional or replacement hardware.

An advantage of the disclosed embodiments is that they may facilitate verifiable installation of digitally signed software which provides cryptographic binding to the unique hardware identifier of the computing device (e.g., mobile device, smart-phone), and in turn provides binding to the identity proofing of the enrolled user, and in turn provides binding to the biometric digital signatures of the enrolled user, thereby providing a "digital chain of trust" that can satisfy the highest assurance authentication and non-repudiation services (e.g., NIST 800-63-3 Electronic Authentication Level 4).

An advantage of the disclosed embodiments is that they may employ positive identity proofing to provide verification that the enrolled user is the owner or authorized user of the financial account, thereby reducing vulnerability to identity theft, use of stolen account credentials, and fraudulent financial transactions.

An advantage of the disclosed embodiments is that they may provide a system and method for the secure remote provisioning, exchange and management of shared-secret key-derivation keys that can be used for symmetrical encryption key generation which does not require special hardware or physical anti-tamper methods for key distribution, thereby enabling more secure, scalable and cost-effective encryption key management while providing a OTP-based cryptosystem with information-theoretical perfect secrecy by using "OTP-like" key structures that are resistant to cryptanalysis and brute force attack such that even quantum computers will not be able to decrypt them.

An advantage of the disclosed embodiments is that they may use at least three-factors plus a dynamic factor which makes it capable of complying with all the requirements of the NIST 800-63-3 Electronic Authentication assurance Level 4 guidelines and HSPD-12 PIV guidelines, thereby providing high assurance electronic authentication that is superior to currently marketed two-factor mobile device and PIV card solutions.

An advantage of the disclosed embodiments is that they may use three-factors plus a dynamic factor complying with all the requirements for NIST 800-63-3 Electronic Authentication assurance Level 4 guidelines, PCI-DSS, EuroPay and EPC standards, thereby providing authentication strength superior to currently certified mobile device electronic authentication solutions.

An advantage of the disclosed embodiments is that they may employ security methods including storage of the unique user's biometric data and device encryption keys only on the computing device itself which forces the fraudsters to attack each device individually, thereby increasing the fraudsters' work effort and limiting their ill-gotten gains to only one user's financial assets at a time, so that even though it may be technically feasible, it would be too expensive do so on a large enough scale to be economically profitable.

An advantage of the disclosed embodiments is that they may replace biometric digital signatures if compromised by simply changing the user's secret password and generating new biometric digital signatures for each new password character, thereby replacing the compromised biometric data and recovering the user's biometric identity.

An advantage of the disclosed embodiments is that they may provide authentication by adding a biometric factor with binding to the other factors (e.g., the device, the secret password, the one-time-challenge), thereby overcoming the cloning and malware bypass vulnerabilities inherent in two-factor authentication methods such as chip-and-PIN and magnetic stripe cards.

An advantage of the disclosed embodiments is that they may provide authentication using a "zero knowledge proof" method for the password and biometric to be validated by the remote authentication system, thereby providing mathematically provable evidence of knowledge of the password and possession of the biometric factors while protecting the confidentiality of the data by not requiring the actual password or biometric data to be transmitted over untrusted networks.

An advantage of the disclosed embodiments is that they may provide a method for securing a one-time authentication factor by combining a one-time challenge PIN with the biometric factor and the secret password factor to create a challenge-response that is not subject to SIM swapping attacks, network eavesdropping, interception or man-in-the middle attacks during transmission over the network.

An advantage of the disclosed embodiments is that they may provide multiple technical factors that support high-strength authentication, while reducing or eliminating the need for the user to memorize long and complex passwords, utilize separate passwords for every application they need to authenticate to, and changing passwords on a periodic basis, thereby providing single password convenience for the user.

An advantage of the disclosed embodiments is that they may it provide a method to replace compromised static physical biometrics such as the fingerprints that were lost in the OPM breach.

An advantage of the disclosed embodiments is that they may provides a user authentication method for digitally signing documents electronically that does not depend on the quantum vulnerable PKI key management system and also does not require new or additional registration and identity proofing of the user for each relying party which current digital signature systems require.

An advantage of the disclosed embodiments is that they may provide a secure way for online transactions to assert a user's identity and prevent anyone else from asserting it across the Internet.

An advantage of the disclosed embodiments is that they may utilize a combination of both a biometric data and a secret password which may provide additional safeguards to secure data even if biometric input is compelled to be produced in a legal proceeding.

BRIEF DESCRIPTION OF THE DRAWINGS

The details of the applicant's exemplary embodiments, their structure and operation, can best be understood in reference to the accompanying drawings in which:

FIG. 1 illustrates an embodiment of a system and method for User and Computing Device Registration using authenticated computing device registration and secure exchange of a device-unique shared-secret key-derivation key with a remote authentication system (e.g., trusted key escrow agent).

FIG. 2(a) is a flow diagram illustrating an embodiment of a system and method for User Biometric Registration by capturing the user's biometric data associated with their secret passwords and constructing biometric digital signatures to register with a remote authentication system.

FIG. 2(b) is a flow diagram illustrating an alternate system and method of User Biometric and Password Registration for capturing the user's secret passwords and biometric data associated with their secret passwords and constructing biometric digital signatures to register with a remote authentication system.

FIG. 3 is a flow diagram illustrating an embodiment of a system and exemplary methods of Payment Credential Registration enabling a user's payment credential authentication and enrollment on computing devices (e.g., mobile devices, smart cards) with the remote authentication system.

FIG. 4(a) is a flow diagram illustrating an embodiment for a method of User Authentication to a Numeric Challenge-Passcode Using Handwriting Gesture Recognition Biometrics utilizing multi-factor authentication plus a dynamic factor comprised of biometric handwriting gesture recognition.

FIG. 4(b) is a flow diagram illustrating an alternate embodiment of a system and method for User Authentication to an Alphanumeric Challenge-Passcode Using Handwriting Gesture Recognition Biometrics utilizing multi-factor authentication plus a dynamic factor comprised of biometric handwriting gesture recognition.

FIG. 4(c) is a flow diagram illustrating an alternate embodiment of a system and method for User Authentication to an Alphanumeric Challenge-Passcode Using a Plurality of Fingerprint Biometrics utilizing multi-factor authentication plus a dynamic factor comprised of using the fingerprint reader on a computing device.

FIG. 4(d) is a flow diagram illustrating an alternate embodiment of a system and method of User Authentication to a Numeric Challenge-Passcode Using Handwriting Gesture Recognition Biometrics Using a Smart Card utilizing multi-factor authentication plus a dynamic factor comprised of entering the response to the challenge-passcode using biometric handwriting gesture recognition on a point of interaction (POI) terminal by inserting a smart card that has the secure-pay app installed.

FIG. 5 is a flow diagram illustrating an embodiment of a system and method for Exemplary User Purchase including trustworthy authentication in e-commerce transactions with a merchant using the secure-pay app by communicating with a remote authentication system.

DETAILED DESCRIPTION OF EMBODIMENTS

The present application describes systems, methods and computer readable media implementing multi factor authentication which invention has a scope defined solely by the claims appended hereto. The multi-factor authentication systems and methods disclosed herein improve secure processing of electronic payments over an internetworked e-commerce environment to comply with a plurality of standards-based security and other commercial and government regulatory requirements from e-commerce payment processing bodies worldwide including but not limited to; the US Payment Card Industry (PCI) Data Security Standard (PCI-DSS), the PCI Payment Application Data Security Standard (PCI PA-DSS), the European Payments Council (EPC) Single Euro Payments Area (SEPA) Cards Standardization (SC S) guidelines, the United States' Federal Financial Institutions Examination Council (FFIEC) guidelines, Quick Recognition (QR) codes conforming to the open standard QR Bill™ Code User Payment Guidelines published by the Electronic Payments Association's Council for Electronic Billing (CEBP), the European Union Short Payment Descriptor (SPAYD) format, as well as other applicable government and industry standards.

The methods and systems disclosed herein can be used on a variety of mobile or non-mobile devices, as long as they have the embedded hardware, such as motion or fingerprint sensors, required to support the systems and methods disclosed herein, including but not limited to:

| | |
|---|---|
| Smart-phones | Intelligent Personal Assistants (e.g., Alexa, Cortana) |
| Smart-watches | |
| Tablet computers | Mobile web devices |
| e-Readers | Wearable computers |

| | |
|---|---|
| Feature phones | Calculator watches |
| Cell phones | Head-mounted displays |
| Mobile computers | Personal digital assistant/enterprise digital |
| Desktop computers | assistants |
| Laptop computers | Calculators |
| Ultra-books | Handheld game consoles |
| Ultra-mobile PCs | Portable media players |
| Mobile Internet devices | Digital still cameras (DSC) |
| Digital video cameras (DVC or digital camcorder) | Robots |
| | Converged devices |
| Pagers | Smart Cards |
| Electronic or manual styluses | Computer Access Cards (CAC) |
| Keyboard track pads | Chip-and-PIN Cards |

Positioning, Navigation and Timing (PNT) Personal Identity Verification (PIV) Cards Devices (e.g., GPS Navigation Systems)

The foregoing list is illustrative rather than limiting and includes all mobile and non-mobile processing and computing devices, such as a processor capable of executing cryptographic algorithms or machine readable instructions that has the hardware, such as motion or fingerprint sensors, and is connected to a communications link for coupling and enabling the transactions between user, applications and authentication services, and other systems known to those skilled in the art or invented or adapted in the future, which hereafter will be referred to as "computing devices".

The systems and methods disclosed herein can be used for trustworthy authentication for a variety of use-cases for electronic payments using any e-commerce enabled or other transaction processing or manual payment systems and methods including but not limited to:

| | |
|---|---|
| Retail Point Of Sale (POS) systems | Street vendors (e.g., Good Humor truck) |
| Restaurant bills | Travel check-in kiosks at airports/train |
| Digital Drivers' Licenses (DDL) | stations |
| World Wide Web browser-based transactions | Mobile or Internet banking services |
| | Mobile or Internet bill-pay services |
| Kiosk based transactions | Mobile or Internet brokerage services |
| Automatic Teller Machines (ATM) | Phone purchases (e.g. telemarketers) |
| Gasoline pumps | Mobile or Internet money transfer services |
| Vending machines | Mobile or Internet transportation services |
| Parking meters | ticketing |
| Pay telephones | Mobile or Internet identification systems to |
| Taxi-cab meters | replace boarding passes |
| Postage machines | Mobile Authentication for on-the-spot |
| Postage Stamps | leasing of rental vehicles |
| Mobile or Internet vouchers, coupons and loyalty cards | Direct mobile device to mobile device payments from users to merchants |
| Mobile or Internet digital content (e.g., streaming media, eBooks) purchases | Direct payments/exchanges from one mobile device user to another |
| Mobile or Internet-based on-line purchases | Digital-signing of documents, delivery |
| Smart TVs | receipts, electronic transactions, contracts, |
| Internet, television, or print advertising product purchases | e-mails, etc. |
| | Electronic bank transfers (e.g., Automated |
| Mobile or Internet auction purchases | Clearing House (ACH), Society for |
| Mobile or Internet in-application purchases | Worldwide Interbank Financial |
| Mobile or Internet authentication for filing income tax returns | Telecommunications (SWIFT)) |
| | Digital notary service |
| Print advertisement merchandise/services ordering | Any other e-commerce system requiring high-assurance user authentication |

Paper Invoice/Bill Payments

The foregoing list is illustrative rather than limiting and includes all transaction processing and other systems known to those skilled in the art or invented or adapted in the future, which hereafter will be referred to as "point of interaction (POI)" systems.

The system and method disclosed is also agnostic to the payment method or nationality of currency used; any payment card issuer or financial institution's modality can be supported. Embodiments disclosed herein could support payment modalities including but not limited to:

| | |
|---|---|
| Credit Cards | Any other payment card type |
| Debit Cards | Checking accounts |
| Proprietary or store issued credit cards | Savings accounts |

| | |
|---|---|
| Pre-paid Cash cards | Brokerage accounts |
| Gift cards | Retirement accounts (e.g., 401k, IRA) |
| Loyalty Cards | Virtual currency accounts (e.g., BitCoin, |
| Phone cards | Ethereum) |
| Health FSA cards | Person-to-person (P2P) electronic |
| Entitlement account cards (e.g., Welfare, Food Stamps, WIC, Medicare, Medicaid) | payments (e.g., Zelle, PopMoney, PayPal, Venmo) |
| PayPal ™ accounts | Barter accounts |
| Home equity or other line of credit account advances | Any other account type used by entities participating in e-commerce |

The foregoing list is illustrative rather than limiting and application includes all payment cards, financial accounts or payment methods known to those skilled in the art or invented or adapted in the future.

The methods and systems disclosed herein for trustworthy user authentication using a computing device, such as a mobile device, and can also be used for a variety of non e-commerce use-cases including user authentication to access to facilities or systems, embedded systems, supervisory control and data acquisition (SCADA) systems, and other use-cases including but not limited to:

| | |
|---|---|
| Computer system log-on | Vehicle or pedestrian access |
| Remote voting systems | doors/gates/turnstiles/toll-booths |
| Secure facility access | Machinery control systems (e.g., |
| Airport boarding gates | environmental control, factory assembly |
| Train/subway/airport turnstiles/gates | line) |
| Check-in systems (e.g., pharmacy counter, doctor's office, division of motor vehicles) | Medical equipment (e.g., imaging systems, ventilators, heart monitors) |
| Multi-person integrity access control security systems | Military weapon systems requiring high-assurance multi-party authorization (e.g., nuclear launch codes) |
| Vehicle ignition systems (e.g., car, truck, bus, train, ship, aircraft, Humvee, tank) | Personal medical devices (e.g., insulin |
| Sobriety testers (e.g., for vehicle ignition systems) | pumps, pacemakers) Mobile device or kiosk voting booths |
| Locks (e.g., building doors, garage doors, vehicle doors) | Queueing systems (i.e. "take-a-number" machines) |

The foregoing list is intended to be regarded as illustrative rather than limiting and includes all other systems or use-cases known to those skilled in the art or invented or adapted in the future.

The methods and systems disclosed herein for the biometric factor in user verification are agnostic to the biometric modality used and support a variety of user biometric authentication technologies and methods with various advantages and disadvantages, singly or in combination, including but not limited to:

| | |
|---|---|
| Handwriting "wave in the air" behavioral dynamic gesture recognition using embedded hardware motion sensors (e.g., accelerometers, gyroscopes, g-meters, geomagnetic sensors) | Iris recognition using embedded cameras Face recognition using embedded cameras Hand geometry recognition using embedded cameras Voice recognition using embedded |
| Handwriting and behavioral/dynamic gesture recognition using touch-screen or touch-pad input methods | microphones Keystroke dynamics Physiological (e.g., measuring pulse, heart |
| Handwriting and dynamic gesture recognition using mobile video camera motion relative to a stationary target | rate and respiration) Cognitive (e.g., measuring stylometry of writing and speech) |
| Handwriting recognition using dynamic mouse or stylus movement characteristics | Behavioral (e.g., measuring browsing habits and device and application use) |
| Fingerprints using embedded contact and contactless fingerprint sensors | Emerging biometrics (e.g., ultrasonic in-display fingerprint readers, finger/palm |
| Continuous User Identification via Touch and Movement Behavior | print capture using high-resolution touch screens, contactless finger/palm/ear/hand |
| Eye movement tracking Skin texture analysis | print capture using high-resolution cameras, ultrasound 3-D fingerprint sensors, LiDAR 3- |
| Ear prints/images | D facial or hand geometry mapping, haptic |
| Palm prints/images | technology, Bluetooth or RFID chip implants, |
| Finger vascular pattern (veins) detection using custom LED devices | computer-brain interface, rapid DNA analysis) |

The foregoing list is intended to be regarded as illustrative rather than limiting and includes all biometric identity technologies or methods known to those skilled in the art or invented or adapted in the future.

While the present invention may be embodied in many different forms, for the purpose of promoting an understanding of the principles of the invention defined by the appended claims, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Each example is provided by way of explanation of the invention, not as a limitation of the invention. It will be apparent to those skilled in the art that various modifications and variations can be made in implementing the claimed invention without departing from the scope or spirit of the invention. For example, features illustrated or described as part of one embodiment can be used on another embodiment to yield a still further embodiment. Thus, it is intended that the invention cover such modifications and variations that come within the scope of the invention. It is further understood that the various embodiments discussed herein need not necessarily belong to the same group of exemplary embodiments, and may be grouped into various other embodiments not explicitly disclosed herein. This description will clearly enable one skilled in the art to make and operate the invention, and describes several embodiments, adaptations, variations, alternatives and uses of the invention, including what is presently believed to be the best modes of carrying out the invention. Different systems and methods can be substituted (e.g., encryption algorithms) without changing the claimed properties.

It will be apparent, however, to one skilled in the art that the invention may be practiced without some of these specific details. In some instances descriptions of the present invention may have been simplified to illustrate elements that are relevant for a clear understanding of the present invention, while eliminating, for purposes of clarity, other elements found in a typical computing devices or applications or methods of sharing data known to those skilled in the art, thereby well-known structures and devices are not shown or are shown in a block diagram form to avoid obscuring the underlying principles of the disclosed embodiments.

An objective of embodiments described herein is to perform the authentication operations at security levels that are compliant with government and payment card industry standards and requirements as described herein. To achieve a high-assurance hardware-enforced digital chain of trust in financial transactions, several layers of best-practices and standards-based security systems and methods must be employed in order to meet payment industry standards such that the systems and methods disclosed will be approved by financial institutions and processing service providers for use in conducting e-commerce transactions. These well-known security structures, even if not explicitly defined herein, are inferred and included in this disclosure by reference.

In the embodiments it shall be understood that the current retail payments industry relies on what is called a four party payment model where the four parties in question are: 1) the user (aka consumer, claimant, prover), 2) the financial institution (aka user's payment account issuer), 3) the merchant (aka relying party) and 4) the remote authentication system (aka payment gateway, verifier, trusted key escrow agent, trusted middleman). Use of any of the parties' titles herein includes all other titles by reference.

Reference will now be made in detail to selected embodiments, the following figures and detailed descriptions describe characteristics and usage of an e-commerce payment application (hereafter referred to as the "secure-pay app") that comprise the elements of the contemplated embodiments of the invention which shall be defined solely by the appended claims, one or more examples of which are illustrated in the accompanying drawings.

FIG. 1 illustrates an embodiment of a high-assurance system and method to securely authenticate and register a user and their computing device (e.g., mobile device, smart card) optionally installing a digitally signed secure-pay app, then generating and securely exchanging a long-term shared-secret key-derivation key with a remote authentication system (e.g., trusted key escrow agent) such as an automated clearing house (ACH) or gateway for processing payment card transactions. A preferred computing device is a mobile device (e.g., smartphone), however, any computing device with the required hardware to support the disclosed methods could be used. The user, using a computing device 100 connects using an application such as a web-browser 105 to a web-site such as a software application provider ("app store") 110 and selects a secure-pay app with a version that is compatible with the brand and model of their computing device 120. The user then downloads the secure-pay app installation file 125 and saves it 130 on the computing device 100. The user then connects using an Internet connected computing device with a web-browser 135 and verifies their legal identity with the remote authentication system, in this example a third-party service provider could provide an "identity proofing" verification service. By way of example, a registration method for high-assurance identity proofing of the user could be performed using a service (e.g., ID.me, Trulioo) that provides remote assessment of identity credentials where the user captures images of physical identity credentials (e.g., passport, driver's license) using the trusted camera affixed to their computing device, which can be compared to the documentation on file with the issuing government agency to confirm the authenticity of the credential.

In one embodiment, which could be used for applications requiring higher-level assurance of the user's identity compliant with the that complies with the Real ID Act, such as boarding an airplane, electronic voting or physical access to secure facilities would be for the user to appear in person before a human registration agent and present proof of identity such as one or more government issued identification documents like a birth certificate, passport, driver's license or the like. While obtaining a driver's license (or digital driver's license as previously discussed) the motor vehicle licensing office could also provide in-person identity verification, and the US Postal Service is planning to offer such in-person identity services by expanding the US Passport application service they already offer. Optionally, when an even higher level of authentication assurance is required, such as to meet NIST 800-63-3 and FIPS PUB 201-2 Level 4 (VERY HIGH confidence) requirements, the human registration agent could verify the user's identity documentation in-person and also witness the user performing the disclosed biometric registration process (as described in FIG. 2(*a,b*)), whereby this embodiment could support any of the above identity proofing methods in order to meet any of the NIST 800-63-3 and FIPS 201-2 assurance levels that may be required by the credential issuers' and/or authentication services' policies.

Optionally, if required by the security policy of the trusted escrow agent (aka remote authentication system), the user may be required to provide proof of ownership of the computing device (e.g., mobile phone) and/or the account the computing device is registered to with a cellular service provider. Upon satisfactory identity verification, the remote authentication system (e.g., trusted key escrow agent) generates three data items 140; the first data item is a unique user identity (user-ID) token 140-1, which by way of example could be constructed for example by using a non-reversible one-way hash (e.g., SHA-2) of the user's Social Security Number (SSN) or equivalent (e.g., Individual Taxpayer Identification Number (ITIN), Alien Identification Number (AIN)), or if they don't have any of these then the user's name with their birthday appended could be used, optionally appended with a secret salt value, thereby making the user-ID tokens in the user registration database resistant to cryptanalysis techniques such as rainbow-table attacks used to compromise the users' personal identifiers. One token generation method would produce a user-ID token that is a short (e.g., 8-12 character alphanumeric) human readable string that the user could memorize and utilize as their universal username for any system that employs a remote authentication system that the user wishes to register with. The user-ID would follow rules such as; it would include only letters A-Z and numbers 0-9, the letters "O" and "I" would not be used to avoid confusion with zero and one, and the first character would not be zero to avoid cutting off digits during data imports. For the second data item the remote authentication system creates a software product activation key (i.e., product license key) 140-2 for unlocking and authorizing the digitally signed secure-pay app during installation, for example a key generated using the Uniloc system for software registration (described in U.S. Pat. No. 5,490,216). For the third data item the remote authentication system creates a high-entropy random one-time-pad encryption key 140-3, for example by using a full-entropy hardware random number generator installed on the remote authentication system's infrastructure, to be used for encrypting and exchanging the key-derivation key (described in step 165) and optionally the user's biometric digital signatures (as described in FIG. 2($a,b$)), between the computing device and the remote authentication system. In this example the encryption key would be a 32-byte (256 bit) string in the form: "28B1 6C97 7BEC BBD7 CB15 3E01 A767 5A63 FFSC 62CC 607B A8DE 6101 6527 0307 FE4E". Then the user-ID token is given to the user to be used during registration (as described in Step 145-1), which completes creation of the three data items comprising step 140. Then the remote authentication system stores the license key and one-time-pad encryption key in a user profile in the user registration database 143 using the user-ID token (as described in step 140-1) as the database key. Then the user telephones the remote authentication system's customer service representative, which could be a human or an automated attendant 145, the user then provides their user-ID token (as described in step 140-1) verbally 145-1 to the customer service representative who retrieves the license key 145-2 and one-time-pad encryption key 145-3 stored in the user registration database (as described in step 143).

After the remote authentication system's customer service representative 150 retrieves the user's profile using the user-ID 150-1, then the license key 150-2 and one-time-pad encryption key may be delivered to the user verbally on the telephone 150-3, it being understood that one or more of these data items may be combined to make the exchange process easier. The security purpose of this verbal out-of-band one-time-pad encryption key exchange method is to preserve the perfect secrecy of the shared-secret data exchange (as described in steps 165 through 185), because it would compromise the security of the user's payment credentials and future e-commerce transactions if the secret key-derivation key, and optionally the user's biometric digital signatures, were intercepted during the exchange and decoded by fraudsters. A benefit of this method is that this key exchange arrangement can be economically scaled to allow providers to manage keys across any number of endpoints, yet the very structure of it raises the fraudsters' work effort to make it uneconomical. A preferred method of inputting the one-time encryption key into the computing device is for the user to enter it in real-time using the trusted keyboard affixed to the computing device as the remote authentication system's customer service representative recites it to them on the telephone so they can perform real-time error correction. As an example, a method for error correction would be to optionally add additional characters as check digits to the license and encryption key strings, such as using the Luhn mod N algorithm, to add one check digit after every 8 characters such that the secure-pay app could display an error message if an incorrect 8 character segment was entered, thereby providing progressive error checking and validation during data entry which would allow the user to conveniently correct errors interactively as they enter the key strings rather than manually searching for errors or re-entering all the characters of a long character string after completing the entry. Alternately the user may request that the remote authentication system's customer service representative send the activation key via hard copy (e.g., Fax, US Mail, UPS, FedEx, Amazon same-day delivery), optionally combined with a key split such that the first or last N digits (e.g., 8 digits) which could be given to the user verbally (as described in step 145-2), which the user must then add those extra digits to the beginning or end of the activation key to maintain confidentiality of the key in the event the hard copy of the key is intercepted in transit, which the user then manually enters on the trusted keyboard affixed to the computing device, it being understood that the method of adding check digits for error correction could optionally be used as described previously. Alternatively, the hard copy activation key could be in the form of bar codes (e.g., QR codes) that could be read by the secure-pay app, optionally with a split key given to the user separately as described previously to complete the activation key entry.

The user then enters the activation key 155 consisting of the software license key and the one-time-pad encryption key, plus optionally the split key as described previously, to begin the installation process of the secure-pay app on the computing device. The secure-pay app installation process 160 then uses the software product activation key (as described in step 140-2) to unlock and install the downloaded secure-pay app (as described in steps 125 and 130), which may optionally be digitally signed by a software code signing service using a strong distribution model (e.g., VeriSign, Symantec, DigiCert, GlobalSign, Google Play, Microsoft Store, Apple App Store, Blackberry World, Amazon Appstore), into the computing device, preferably into the protected storage of the computing device, for example encrypted with a hardware enforced Secure Element (SE), Secure Processing Unit (SPU) or Host Card Emulation (HCE) product that provides anti-tamper protection. The security purpose of this digital software code signing combined with hardware enforced protected storage method is to provide a 'trusted boot' process by providing cryptographic verification of the secure-pay app by the computing device whenever the app is executed so that it cannot be copied and run on any other computing device, or be replaced or infected with malware while in long-term storage, thereby significantly raising the work effort of a fraudster to compromise the secure-pay app software. The secure-pay app installation process then 165 generates an immutable unique device identity (device-ID) token 165-1 for the computing device which is preferably equipped with an unclonable device-unique hardware identifier, and if not, by utilizing software cryptographic methods such as Q-PUDID software (as described in the present application DESCRIPTION OF RELATED ART) that creates an immutable quasi-physically unclonable digital ID by operating on physically identifying properties of the computing device, or optionally if the computing device is a mobile phone then by using identifiers such as the International Mobile Equipment Identifier (IMEI), the Mobile Equipment Identifier (MEID) or equivalent, optionally combined with the user's mobile phone number, or by using any software, hardware or other equivalent method known to those skilled in the art or invented or adapted in the future.

The secure-pay app then performs cryptographic transforms using the device-ID token to generate a derived long-term shared-secret encryption key-derivation key 165-2. While many methods known to those skilled in the art to generate the key-derivation key are possible, by way of example, it could be created by appending the user-ID token to the device-ID token and the product activation key (as described in step 140-2), thereby creating "sealed" data using cryptographic binding between the user, their immutable computing device-ID and the installed copy of the secure-pay app software during installation and registration with the remote authentication system. The security purpose of using this key-derivation key generation method is that any subsequent session encryption key created using it binds the computing device (by using the unclonable device-unique hardware identifier) to the authorized user (using the user-ID token) and to the registered software (by using the product activation key), thereby creating a digital-chain-of-trust that provides cryptographically strong digital authentication and non-repudiation for every future e-commerce transaction conducted by the registered user with the registered secure-pay app installed on the registered computing device. Other algorithms known to those skilled in the art could alternatively be used to create the key-derivation key, for instance, some computing devices' CPU chips include a hardware key generation unit for generating the long-term shared-secret cryptographic key-derivation key using received input such as the user-ID token (as described in step 140-1), appended to the immutable and unclonable unique device-ID identifier token (as described in step 165), and the product activation key.

The generated key-derivation key (as described in step 165) is then stored in long-term storage on the computing device 170, preferably in hardware-protected and/or password protected credential storage, for example the Android KeyStore, Apple iOS Keychain, Trusted Platform Module (TPM) or equivalent technology if the computing device is so equipped, thereby increasing the fraudsters' work effort by rendering the encrypted data difficult to decrypt even if the computing device is lost, stolen or infected with malware. If the computing device is not equipped with hardware enforced encrypted storage, another embodiment could use a software defined biometric encryption key management solution such as described in U.S. Pat. No. 6,219,794 B1), where a digital key is generated and bound to a biometric through a secure block of data known as a "protected filter", where the key is not released other than via the interaction with the correct user's biometrics, which key can then be used the encrypt a secure container where sensitive data like the disclosed user-ID, device-ID, key-derivation key, digital biometric signatures and the software's trusted-boot digital signature can be stored. Said key-derivation key may be used to generate future session encryption keys with the remote authentication system using a key exchange method such as Internet Key Exchange 2 (IKEv2), as described in IETF standard 79 (RFC 7296) using the "pre-shared key" option in order to achieve quantum resistant transmission confidentiality.

The one-time-pad encryption key (as described in step 140-3) of the same length as the key-derivation key is then used to encrypt the derived long-term shared-secret key-derivation key 175, which is then wirelessly transmitted to the remote authentication system 180, which is then stored in their device registration database 185 keyed with the unique device-ID token (as described in step 165) as the database key. The key-derivation key (as described in steps 165 and 170) may be used to derive session encryption keys to provide transmission confidentiality for future e-commerce transactions communicated between the user and the remote authentication system (as described in FIG. 5 step 518). The security strength of the out-of-band one-time-pad encryption key-derivation key exchange method is based on the fact that the only known vulnerabilities to the information-theoretically secure perfect secrecy of the one-time-pad encryption method is that it can be compromised if a man-in-the-middle can obtain the one-time shared-secret key while it is being exchanged between the parties or from one of the parties after the exchange, therefore, the remote authentication system must destroy the one-time-pad encryption key 190 and the secure-pay app must destroy the one-time-pad encryption key 195 on the computing device, and the user must destroy any copies of the activation key they received (as described in step 145-2) immediately after the key exchange is performed (as described in step 180) in order to preserve the perfect secrecy of the key exchange. The registration process described by steps 140 through 195 omitting step 160 can be repeated at any time if required as a result of the key-derivation key being compromised, or if the remote authentication system's security policy requires periodic changing of the key, thereby the keys generated using this method can be replaced as needed if lost or stolen.

In a further embodiment other key management schemes such as Derived Unique Key Per Transaction (DUKPT) (described in U.S. Pat. No. 5,745,576) as, for example, specified in ANSI X9.24 part 1 which changes transmission encryption keys for every e-commerce transaction could be utilized. In this embodiment the out-of-band one-time-pad encryption key exchange method (as described in step 150) could be used to transmit the Initial PIN Encryption Key (IPEK) which is then used to derive future keys and is then discarded during the secure-pay app installation process (as described in steps 160 through 195). This one-time-pad based cryptosystem using IPEK key-derivation keys to cryptographically derive ephemeral OTP keys can provide equivalent perfect secrecy for data in transit (as described in Steps 180 through 195). In an alternative embodiment a Hardware Security Module (HSM) such as the Thales payShield or nShield mobile Point of Sale (mPOS) system or any other system or method known to those skilled in the art or invented in the future could be used to provision and manage the encryption keys on a computing device with the secure-pay app installed. These embodiments may be useful to make the secure-pay app compliant with PCI-DSS requirements or other international standards for mobile merchant Point Of Sale (POS) systems, or for direct user-to-user transactions between mobile computing devices and the like.

It should be noted that the internal construction of the secure-pay app should be designed to comply with all application security requirements of the e-commerce industry governing bodies (e.g., PCI PA-DSS, EPC-SCS, FFEIC, EMV), should incorporate security best-practices such as secure code development, running the application in 'chroot jail' to enforce access restrictions, and should include a hypervisor with a trusted monitor using techniques such as digitally signed software white-listing that will not allow the secure-pay app to run in secure mode if there are untrusted apps in memory that are not digitally signed by a trusted source (as described in step 160), thereby protecting from advanced attack vectors such as a rogue malware process running on the device. This run-time malware defense is advisable, especially in the case of jail-broken phones or phones configured to give the user the ability to install apps from untrustworthy sources. While there may be no foolproof way to prevent compromise of the secure-pay app on the device, these embodiments used in combination will raise the work effort and complexity for the fraudster and will prevent all but the most skilled and well-resourced from succeeding.

The methods disclosed in these embodiments provide a reasonable compromise between maximizing security and minimizing the resources required for key management and processor load for performing encryption, however, it is understood that these embodiments are intended to be illustrative only and not limiting.

It should be noted that nothing in this disclosure requires the user to perform the registration process in their country of origin, nor to use the registering country's identity verification information, thereby allowing registration to occur in any location regardless of citizenship.

FIG. 2(*a*) is a flow diagram illustrating an embodiment of a high-assurance user biometrics registration process to utilize the user's registered computing device 200 (as described in FIG. 1) equipped with biometric sensor(s) (e.g., motion sensor, fingerprint reader, touch-screen) for securely capturing the user's biometric identifiers using the installed secure-pay app 210 and registering them with the remote authentication system 205. The registered user 260 (as described in FIG. 1 step 135) is prompted by the computing device to register each character of a secret authentication password 215 of arbitrary length one at a time by using the computing device's biometric sensors using either Method 1 or Method 2 as described below. The user may then be prompted by the secure-pay app 210 to enter a secret duress password 220 that can be employed by the user in the event they are being forced to authorize a transaction against their will as described below. It should be noted that each character may beneficially be entered multiple times in order to train the secure-pay app to recognize the user's biometrics with high enough fidelity to prevent false positives and false negatives in use. The secret passwords can be any combination of characters in any language, or even Mooney images, pictograms, or graphic figures that are supported by the computing device, but in the simplest example it can be a 5 to 9 letter word that is easy to remember.

It should be noted that the security strength of the disclosed system and method does not depend on the user remembering long and complex passwords, which were designed to resist brute-force dictionary attacks as in older single-factor authentication systems, because the disclosed method generates a binary passcode of much higher complexity than even the most complex human readable passwords by using cryptographic methods on the users' biometric digital-signatures derived from the simple secret password, nor does it require the secret password itself to be transmitted between the user and the remote authentication system (as described in Step 490), thereby eliminating the vulnerability of interception and decoding of the secret password by a man-in-the-middle attack during transmission. It should also be noted that the disclosed system and method which relies on multiple technical factors to provide high-strength authentication, reduces or eliminates the need for the user to memorize long complex passwords and/or multiple passwords for every system they need to authenticate to, and minimizes changing passwords on a periodic basis.

An optional secret duress password (as described in Step 220) can be employed by the user in the event they are being forced to authenticate to authorize a transaction under threat, coercion or against their will (e.g., in a fraud, hostage, kidnap, or holdup scenario). In addition, in a scenario where a fraudster has forced (e.g., using threat or coercion) the user to reveal their secret password the user can instead supply the secret duress password in order to thwart authentication by the fraudster as well as alerting the remote authentication system of possible fraudulent activity. The response in the event of entry of the secret duress password can be agreed to by the user and the remote authentication system and optionally the financial institution at the time of payment credential registration (as described in FIG. 3) and could optionally include either approval, denial or limitation of the transaction and possibly immediate notification of the nature of the distress signal and the location of the computing device (e.g., mobile device, smartphone) to local law enforcement authorities and/or the merchant's security office as applicable. The secret passwords selected can be any word or string of characters of arbitrary length that the user can easily remember, in this example 5 characters are used corresponding to the 5 fingerprints in Method 2 demonstrating one character assigned to each finger, however at least 5 characters are recommended in order to prevent an in-person observer from capturing the entire secret password during a 4-character authentication sequence (as described in FIG. 4).

For security reasons it is recommended that the user not use passwords such as their name or family members' names, the street they live on, their birthday, anniversary, or anything associated with them that can be discovered from publicly available sources (e.g., social media). Then the registered user 260 is prompted by the secure-pay app 210 to enter the secret password characters as described in one of the following two exemplary methods by utilizing the computing device's sensor hardware:

Method 1: This method implements dynamic biometric handwriting gesture recognition technology as disclosed in U.S. Pat. No. 10,367,805 and utilizes the motion-sensing hardware present in most mobile computing devices (e.g., accelerometer, g-meter, gyroscope, geomagnetic sensor) to sense the unique shape of characters as well as the sequence, speed and acceleration of strokes as the user employs the device like a wand to draw the characters in the air, or depending on the sensitivity of the device's motion-sensing hardware, they could hold the corner of the device and use it like a pen as if they were writing on a flat surface, or alternatively the user could draw the characters on a trusted touchscreen affixed to the computing device. The user enters each character of the secret authentication and duress passwords one character at a time when prompted by the secure-pay app 210 which then captures the biometric handwriting minutiae 270a as it is entered by the user.

Method 2: This method uses fingerprint sensor hardware available on some computing devices for the user to register their fingerprints by pressing or swiping their fingers on the fingerprint sensor 250 which then captures the fingerprint biometric minutiae (e.g., conformant with recognized standards such as the International Committee for Information Technology Standards (INCITS 378-2004) MINUSTD minutiae template standard). The user assigns one character of the secret password to each finger and enters each character in the authentication and duress passwords one character at a time when prompted by the secure-pay app 210 which captures the biometric fingerprint minutiae 270b. Note that in the case of using fingerprints as the biometric method the user's secret password may be agnostic to the fingers the user assigns the secret passwords to (e.g., right hand or left hand or both, left-to-right or right-to-left order). This human randomness factor would further increase the work effort for an eavesdropping adversary to capture and decode the secret password, and also makes the method more flexible for use by partially handicapped persons with injured or missing hands or fingers. Once the secret passwords and corresponding biometric minutiae are captured, the secure-pay app saves the biometric minutiae to the computing device's credential storage (as described in FIG. 1 step 170) 275, then the secure-pay app 210 uses cryptographic methods to transform the biometric minutiae data and create a unique "biometric digital-signature", also referred to as a derived "electronic signature", for each character in each of the two secret passwords. The secure-pay app then creates 2-tuples containing a number representing the secret password character's offset position within the password string paired with the corresponding biometric digital-signature for that character 280.

Various methods and algorithms could be used to create the biometric digital-signatures, but by way of example the biometric template minutiae data could be concatenated with the unique user-ID token (as described in FIG. 1 step 140-1) which would create a cryptographic binding between the biometric minutiae for the secret password character and the user, then this string could be hashed using a one-way hash algorithm such as SHA2-384 and truncated to a length such as 8 bytes (64 bits). This truncation serves two purposes; one, it minimizes the amount of data that needs to be encrypted and transmitted to the remote authentication system during future electronic authentication transactions (as described in FIG. 5. step 545) as well as during the registration process (as described in step 290), and two, it ensures that even if captured by a fraudster the partial (e.g., truncated) hash digest of the biometric digital-signature would be mathematically impossible to perform cryptanalysis and reveal the personally identifiable information (e.g., the complete biometric template minutiae) of the registered user. It should be noted that the truncated biometric digital-signature has a finite probability of creating a hash collision between two letters of a user's password, however, when combined with the unique user-ID it would have a vanishingly small probability of creating a hash collision between digital-signatures of two different users, and even if a collision does occur, the user could simply select another character or secret password that does not include the characters that collide. Another advantage of this method is that unlike static physical biometric data, in the event the derived biometric digital-signatures are captured by a fraudster or otherwise compromised they can be changed easily by the user by simply selecting a new secret password and repeating the registration process with the remote authentication system (as described in steps 250-280).

Once the biometric digital-signature 2-tuples are created, they will be saved, preferably in the computing device's credential storage 285 (as described in FIG. 1 step 170). To complete the user registration process with the remote authentication system (e.g., trusted key escrow agent), the 2-tuples (as described in step 280) are transmitted to the remote authentication system 290 over a secure session (as described in FIG. 5 step 518), optionally encrypted using a portion of the one-time-pad encryption key (as described in FIG. 1 step 175) to provide perfect secrecy (as described in FIG. 1 steps 180 through 195), and stored in the remote authentication system's user registration database 295 using the unique user-ID token (as described in FIG. 1 step 140-1) as the database key, thereby completing the user registration process. It should be noted that in order to maintain the secrecy of the user's personally identifiable information, neither the raw biometric minutiae data nor the secret password characters should ever be transmitted to or shared with the remote authentication system, and the secret authentication and duress passwords themselves are not stored on the computing device, but instead only the biometric digital signature 2-tuples consisting of each character's position within the password and the biometric digital signature for that character are stored by the secure-pay app, preferably in the computing device's credential storage (as described in FIG. 1 step 170).

In a further embodiment, step 285 would be changed to store the user's biometric handwriting minutiae and the biometric digital signature 2-tuples on a smart card with the secure-pay app installed as described in FIG. 4, all the remaining steps in FIG. 2(*a*) would remain the same.

FIG. 2(*b*) is a flow diagram illustrating an exemplary embodiment of a high-assurance user biometrics registration process using their registered computing device 200 (as described in FIG. 1) equipped with trusted biometric sensor(s) (e.g., motion sensor, fingerprint reader, touchscreen) for securely capturing the user's secret passwords and biometric identifiers using the installed secure-pay app 210 and registering them with the remote authentication system 205. The registered user 260 (as described in FIG. 1 step 135) enters an arbitrary length secret authentication password 215 into the secure-pay app 210 using the trusted keyboard 230 affixed to the computing device, and the trusted display 240 affixed to the computing device displays the secret authentication password 225, then the user saves the password they entered 235 to the computing device's credential storage (as described in FIG. 1 step 170). The user is then prompted by the secure-pay app 210 to enter a secret duress password 220 that can be employed by the user in the event they are being forced to authorize a transaction under threat, coercion or against their will. To prevent an eavesdropper from capturing the secret password(s) they should enter the alphanumeric characters of their secret password into the computing device during this registration process in private so that no one can observe the secret password characters as they are being entered, and the user should only memorize the secret password and never write it down or store it in a computer system or file or share it with anyone else. It should be noted that this embodiment compared to the embodiment described in FIG. 2(*a*) may be less secure as it requires the secret passwords characters to be displayed and stored on the device, and because it displays the actual password characters on the computing device during authentication (as described in FIG. 4(a-d)) making the password more susceptible to capture by in-person eavesdroppers or malware on the device. Therefore, this embodiment would be a less secure alternative for users that were not able to easily associate the password characters mentally with their associated challenge digits during authentication (as described in FIG. 4(a) step 475). All the remaining steps in this embodiment are the same as described in FIG. 2(a) with the exception of 265 and 275 where the user then presses the "Save" button 265 on the computing device to save the passwords and corresponding biometric data to the computing device's credential storage (as described in FIG. 1 step 170) 275.

FIG. 3 is a flow diagram illustrating three methods that are alternative embodiments for enrolling a payment card or financial account in the remote authentication system's (e.g., trusted middleman's) user registration database using payment credential tokens that can be used by the secure-pay app for future financial transactions (as described in FIG. 4). It should be noted that the following method for substituting cryptographic tokens for payment credentials should mandate the disclosed multi-factor authentication method in order to authorize use of the credential tokens for financial transactions, thereby rendering the tokens by themselves useless to fraudsters if captured.

Method 1: Using the computing device, for example a mobile device 310, the user takes a picture with the trusted camera 315 affixed to the computing device of a payment card they want to enroll 305 using the secure-pay app which then uses optical character recognition to capture data including the account number and expiration date on the card 320. The user then enters the payment card security code (e.g., Card Verification Value (CVV), Card Security Code (CSC)) that is typically located on the back of the card by using the trusted keyboard affixed to the computing device 325, then completes the payment credential registration in steps 370 through 395 described below.

Method 2: Using the computing device 310 the user takes a picture of a specially formatted account enrollment QR Code printed on the financial institution's statement 330 for the account they want to register with the trusted camera affixed to the computing device 315 using the secure-pay app 320. If required by the financial institution's security policy, the user enters the security code (e.g., PIN) for the account using the trusted keyboard affixed to the computing device 325, and completes the payment credential registration in steps 370 through 395 described below.

Method 3: The user registers the payment credential with any Internet connected mobile computing device 360a or other computing device 360b equipped with a browser by accessing a secure web-site provided by the remote authentication system, or the financial institution or a third party, and completes the credential enrollment on-line. After completing one of the three enrollment methods described above, or any other method known to those skilled in the art or adapted or invented in the future, the user then logs-in to the remote authentication system's credential registration system by authenticating 370 with their computing device (as described in FIG. 4). Then the secure-pay app submits the payment credential enrollment request to the remote authentication system who verifies the validity and ownership of the payment credential by comparing the registered account owner's data on file with the issuing financial institution to verify that it matches user's identity data stored in the user's profile in the user registration database (as described in FIG. 1 step 135) on the remote authentication system 375.

It should be noted that for fraud detection and prevention reasons the financial institution may optionally call, text, e-mail and/or postal mail a notice to the account holder to alert them that the payment credential was enrolled on the computing device in the event the user did not authorize it, thereby minimizing the risk of fraudulent or stolen payment credentials being enrolled on the computing device by using the secure-pay app. The remote authentication system then generates a unique credential token 380 for the payment account, in this example one that is compliant with the Europay, MasterCard and Visa (EMV) global standard, hereafter referred to as an "EMV token", it being understood that any other identity token technology in use today (e.g., blockchain) or invented or adapted in the future could be used. The combination of steps 375 and 380 bind the payment credential to the user authenticated in step 370, thereby ensuring the strength of the authorization and non-repudiation attributes of future transactions made with the secure-pay app using the enrolled payment credentials. Then the remote authentication system stores the payment credentials in a user registration database (as described in FIG. 2 step 295) on a secure infrastructure system that is compliant with payment card standards (e.g., PCI-DSS, EPC, FFIEC) using the user-ID token as the key, then securely transmits the payment credential token (e.g., EMV token) 390 back to the user's computing device 310, and then the secure-pay app 320 stores the payment credential token in the computing device's credential storage (as described in FIG. 1 step 170) 395. The combination of these methods (as described in FIG. 3) provides that the payment credential data (e.g., name, card/account number, expiration date, security code) are transmitted securely by the secure-pay app only once during the credential registration process, are stored only on the remote authentication system's (e.g., trusted escrow agent's) protected storage infrastructure (e.g. a Hardware Security Module (HSM)), and are stored preferably in credential storage (as described in FIG. 1 step 170) on the computing device.

The combination of these methods for utilizing payment credential tokens by the secure-pay app, which in this embodiment are valid only when used in combination with the users' multi-factor authentication (as described in FIG. 4(a-d)), serve the security purpose of ensuring that the sensitive account details are not exposed during storage on the computing device, during transmission over the untrusted network for each transaction as well as eliminating the need for their processing and storage on the merchants' insecure payment processing systems, thereby minimizing the attack surface containing multiple vulnerabilities in the current e-commerce system that are frequently exploited by fraudsters.

In a further embodiment the secure-pay app could be used as a digital wallet by allowing the user to create a virtual account, for instance using an on-line wallet provided by the remote authentication gateway, an on-line bank, a third-party, or a domestic or foreign bank as the fiduciary. By interacting with any merchant with a POI terminal, they could deposit cash with the merchant who would enter it in their system similar to a negative purchase (i.e., refund), thereby crediting the user's digital wallet account.

FIG. 4a is a flow diagram illustrating an embodiment of a method of authenticating a user by utilizing multi-factor authentication plus a dynamic factor comprising Factor 1; "something you have", e.g., a registered computing device (as described in FIG. 1), plus Factor 2; "something you are", e.g., a behavioral or dynamic biometric such as handwriting gesture recognition or multiple fingerprints (as described in FIG. 2(a,b)), plus Factor 3; "something you know", e.g., one or more secret passwords (as described in FIG. 2(a,b)), combined with a dynamic Factor e.g., a high-entropy (i.e., unpredictable) one-time challenge consisting of a random sequence of digits that is never repeated until the authentication keys are changed, received from a remote authentication system in order to authenticate to a challenge-passcode generated by the secure-pay app as described herein. It is understood that the term "mobile device" in this description is illustrative only and not limiting, any computing device with the required hardware affixed thereto could be used. By way of example, the user has previously chosen at the time of user biometric registration (as described in FIG. 2(a,b)) two different secret passwords of arbitrary length; one for the secret "authorization password" and one for the secret "duress password".

An optional second biometric authentication process begins when the user opens the secure-pay app 410 on the registered computing device 400, where the user unlocks the computing device and/or the secure-pay app by using handwriting gesture recognition biometric method, such as that used in the prior art described above, with an arbitrary number of digits such as 2 in this example, which will provide biometric security for access to the sensitive data (e.g., biometric digital-signature plus password character 2-tuples, encryption keys, encryption key-derivation keys) from credential storage (as described in FIG. 1 step 170) on the computing device. The security purpose of requiring the optional biometric authentication step to access the secure-pay app and the sensitive data is to require two-factor authentication to provide data confidentiality which raises the work effort for a fraudster to access the sensitive data in the event the device is lost or stolen, and to increase the security strength to minimize the risk of fraud for lower-value transactions that currently only require one-factor authentication (i.e., possession of the registered computing device).

In this example the user begins the multi-factor authentication process by scanning the QR code containing the details of the transaction from the display on the merchant's Point of Interaction (POI) device (as described in FIG. 5) by using the registered computing device's 400 trusted camera, or alternately transferring the data using proximity-based (i.e., short range) radio frequency technology (e.g., Near Field Communication (NFC), Bluetooth, Wi-Fi) if supported by the registered computing device and the merchant's POI terminal 415, to transfer the transaction data to the secure-pay app 410 installed on the registered computing device 400. The secure-pay app then establishes an end-to-end encrypted session 417 with the remote authentication system over the network (as described in FIG. 5 step 516 and 517), then transmits to the remote authentication system over the encrypted network session the payment authorization request 420 including data such as:
- the registered user-ID token (as described in FIG. 1 step 140-1);
- the registered device-ID token (as described in FIG. 1 step 165)
- the payment credential token (e.g., EMV token) for the enrolled payment account that the user wants to disburse from (as described in FIG. 3 step 380);
- the detailed transaction data, and;
- a keyed-hash Hashed Message Authentication Code (HMAC) of the above payment request details.

The secure-pay app calculates a keyed-hash HMAC of the transaction data to enable the remote authentication system to cryptographically check the authenticity and integrity of the data to validate it has not been corrupted, altered or tampered with in transit. Upon receipt of the transaction data the remote authentication system then generates a dynamic numeric one-time random challenge 425, for example as described by the Dynamic Passcode Authentication (DPA) method, of arbitrary length but preferably not less than 8 digits in order to comply with the NIST SP 800-63-3 which requires at least 64 bits of entropy for Level 4 e-Authentication, for example by using a commercially available hardware high-rate, high-availability, full entropy random number generator. In this example the number "79837657" will be used to represent the dynamic numeric one-time random challenge. The arbitrary length of the dynamic numeric one-time random challenge may optionally be varied according to the security policy of the remote authentication system and/or the financial institution based on factors such as the size of the transaction, the level of risk derived from factors such as the history of the merchant, or the trustworthiness and location of the network in order to tailor the strength of security parameters proportional to the risk of loss. For example, the remote authentication system may require no biometric user authentication because mere possession of the registered computing device with the secure-pay app which has been already unlocked by the user with their biometric identifiers (as described in Step 410 above and FIG. 1 step 170) which provides two-factor authentication which may be sufficient for small transactions under $50 for example. Transactions over $50 and under $300 may require a 4-character challenge-passcode to which the user must authenticate using all three identity factors plus a dynamic element as described herein, over $300 and less than $10,000 may require 6 character challenge-passcode, over $10,000 may require 8 character challenge-passcode, and larger transactions may require an even stronger challenge-passcode using more than 8 characters. The faster two-factor method for payment of small transaction amounts may also be useful for transaction types that require rapid authentication such as highway toll booths, subway turnstiles, bus coin-boxes, admission to movie theaters or other entertainment venues, etc.

Next, the secure-pay app uses the first 4 digits of the dynamic numeric one-time random challenge (in this example the first 4 digits are "7983") to construct the one-time numeric challenge-passcode. In order to convert the digits in the dynamic numeric one-time random challenge, which can range from 0 to 9, into digits corresponding to the character positions in the user's password, which for example could range from 5 to 9 characters in length, the modulo mathematical function will be used. Hence the formula used to calculate each digit in the dynamic numeric one-time random challenge is to take the modulo of the user's secret password length plus 1 (1 is added because the zero position in a password string would not be valid). In this example the password length is 5 and the numeric one-time random challenge digits are "7983", thus (7 (mod 5)+1)=3, (9 (mod 5)+1)=5, (8 (mod 5)+1)=4, and (3 (mod 5)+1)=4, which yields "3544" 430. The secure-pay app 410 would then optionally perform a second round of randomization on the original challenge-passcode string by applying a randomization algorithm such as a Fisher-Yates shuffle 450 with random numbers generated using the best method supported by the computing device hardware, possibly using the dynamic numeric one-time random challenge as the seed to increase entropy, thereby generating a double randomized challenge-passcode that is confidential and known only by the device 455, by way of example the number "4354" is used here, that will only be displayed on the trusted display affixed to the computing device and never transmitted by the device. The double randomized dynamic numeric one-time random challenge-passcode 465 is then displayed on the registered computing device's 400 trusted displayed screen 460.

The registered user 470 (as described in FIG. 2(*a,b*)) then reads the 4-digit challenge-passcode on the display and associates in their mind each digit to the corresponding memorized secret password character, choosing to enter the corresponding characters from either their authorization password or their duress password depending on their intention to authorize or reject the transaction, then using the registered computing device 400 as a wand or pen (as described in FIG. 2(*a,b*), step 270*a*) to draw the password characters they wish to enter 475. Then the secure-pay app 410 captures those characters using the mobile device's motion sensors and retrieves the secret authorization and duress password biometric minutiae from credential storage (as described in FIG. 1 step 170) on the computing device, and in this example using handwriting gesture recognition as each character is drawn by the user in the correct order to match the randomized challenge-passcode (as described in step 455), if the captured biometric minutiae data compared with the biometric template minutiae for the 2-tuple associated with that digit of the user's password is validated successfully for each character in the challenge-passcode, authentication of that character succeeds and a confirmation checkmark 485 may optionally appear on the trusted display 460, and/or a haptic response such as a vibration or beep could signal the user of the success or failure after entering each character. The secure-pay app could optionally have an automatic lockout after a configurable number of tries (e.g., a number that could be governed by the remote authentication system's security policy) to complete the authentication, for instance 3 tries, so that in the event the device is lost or stolen and falls into the hands of a fraudster they would be locked out after a limited number of unsuccessful attempts and the remote authentication system could be alerted, thereby increasing the fraudster's work effort and risk of detection. After all the characters in the randomized challenge-passcode from either the authorization password or the duress password (as described in Step 455) are successfully entered, the challenge-response characters in the random order (as described in step 450) are then reshuffled back into the challenge-passcode's original order (as described in step 445) by reversing the second round of randomization done on the computing device (as described in Step 450).

The secure-pay app then retrieves the secret authorization and duress password digital-signature 2-tuples from credential storage (as described in FIG. 1 step 170) on the computing device, and in this example constructs a challenge-response by concatenating the user's biometric digital-signatures (as described in FIG. 2(*a,b*), Step 280) in the order corresponding to each of the digits in the one-time challenge-passcode's original order, then optionally concatenates the resulting string of digital signatures with the device-ID token and the user-ID token, and optionally concatenates the resulting string with the dynamic numeric one-time random challenge received from the remote authentication system (as described in step 425), and hashes the result with a one-way hash algorithm such as SHA-384. The security purpose of this method is to make it impossible for a MitM attacker to decode the authentication challenge-response or reconstitute the biometric digital-signatures, and this method using the dynamic numeric one-time random challenge would result in a vanishingly small probability of successfully using an intercepted authentication response to conduct a re-play attack. The security purpose of using the SHA-384 hash algorithm is that there are no known hash collision (i.e., length extension) attacks that have been successful to-date, and it is also on the NSA's list of quantum resistant hashing algorithms.

Optionally, to provide further protection against future hash collision attacks, a second round of hashing using an algorithm with a different word size (e.g., SHA-512) could be applied to the first hash because currently the public cryptographic community believes there is no possible or theoretical attack against the "double hashing" method. The secure-pay app then transmits the hashed challenge-response along with the transaction details and HMAC (as described in step 420) and the original dynamic numeric one-time random challenge (as described in step 425) back to the remote authentication system 490, thus completing the multi-factor authentication process by the registered user using their biometrics, their secret password, the registered computing device and the correct response to the random one-time-challenge. If all the digits of the challenge-response, in this example 4 digits, match the authentication challenge-passcode then the user has successfully authenticated (as described in FIG. 5 Step 546). If the result does not match then optionally the remote authentication system can repeat the process (as described in step 490) by using the digital signature 2-tuples for the duress password and comparing that result to the authentication response received from the secure-pay app, and if those results match then the duress procedure as defined in the remote authentication system's security policy is triggered. If neither result produces a match then authentication fails (as described in FIG. 5 step 548 through 550) and the transaction is disapproved. A security purpose of using the numeric challenge-passcode in this embodiment is to protect the secrecy of the user's passwords by never storing or displaying the password characters themselves on the device, thereby increasing the fraudster's work effort to capture and decode the secret password by visually eavesdropping on the authentication process. Another security purpose of authentication using the disclosed system and method is that it comprises a "zero-knowledge proof" that the user knows the secret password without revealing the password in the response, wherein returning the correct biometric digital-signatures associated with each of the secret password's characters in the correct order as defined by the random dynamic challenge proves the user's knowledge of their secret password to the remote authentication system. A purpose of optionally sending the original dynamic numeric one-time random challenge back to the remote authentication system is to enable a "stateless" process (as described in FIG. 5 step 546) so that the remote authentication system optionally does not have to store the dynamic numeric one-time random challenge while awaiting completion of the user authentication process.

This system and method provides high-assurance authentication and non-repudiation compliant with the NIST SP 800-63-3 standards because the secure-pay app has provided all of the electronic authentication factors disclosed therein which are cryptographically bound in a digital chain of trust during the registration processes as disclosed herein (as described in FIG. 1 and FIG. 2) include; 1) immutable and unclonable device-ID token proving possession of the registered computing device, 2) user biometric data matching the registered biometric digital signatures providing proof of biometric identity, and 3) zero-knowledge proof of the user's knowledge of their secret password and 4) the correct response to a random one-time challenge sequence. Completion of the disclosed authentication process verifies that the user has satisfied an electronic identity assertion and proved with high confidence that the asserted electronic identity belongs to the user who is asserting it and not another attempting to pose as the user. It is to be understood that these embodiments could be implemented using various biometric methods, passcode algorithms, mathematical formulas, cryptographic methods, configuration details, and other methods or combination of methods known to those skilled in the art or invented or adapted in the future, therefore this embodiment is intended to be illustrative only and not limiting.

FIG. 4(b) is a flow diagram illustrating an alternate embodiment where the user is presented with an alphanumeric challenge-passcode. This embodiment follows steps 415 through 425 (as described in FIG. 4(a)), but steps 430 and 465 (as described in FIG. 4(a) are replaced as follows and steps 435, 440, and 445 are added. First a numeric challenge-passcode is constructed by calculating for each digit in the 8-digit numeric one-time random challenge 425, in this example "79837657". In order to convert the digits in the dynamic numeric one-time random challenge the modulo mathematical function will be used (as described in FIG. 4(a), step 430) to convert each digit to the position of the corresponding secret password character by using the modulo of the user's secret password length plus 1 (1 is added because the zero position in a password string would not be valid); so for this example (7 (mod 5)+1)=3, (9 (mod 5)+1)=5, (8 (mod 5)+1)=4, and (3 (mod 5)+1)=4, (7 (mod 5)+1)=3, (6 (mod 5)+1)=2, (5 (mod 5)+1)=1, and (7 (mod 5)+1)=3, which yields "35443213" 430. Then the resulting numeric challenge-passcode 430 digits are each replaced by the corresponding characters from the user's secret authorization password, in this example the password is "james" and the first 4 digits of the numeric challenge-passcode are 3544, thus the digit 3 is replaced with "m", the digit 5 is replaced with "s", the digit 4 is replaced with "e", and the digit 4 is replaced with "e", yielding the string "msee" which forms the authorization portion of the alphanumeric challenge-passcode 435.

Similarly, the duress portion of the alphanumeric challenge-passcode is constructed using the second half of the numeric challenge-passcode 430, in this example the second 4 digits are "7657", and those digits are replaced by the corresponding characters in the user's secret duress password, in this example "funky", thus the digit 3 becomes "n", the digit 2 becomes "u", the digit 1 becomes "f", and the digit 3 becomes "n", and concatenating them yields the string "nufn" which forms the duress portion of the one-time alphanumeric challenge-passcode 440. The complete 8-character original alphanumeric challenge-passcode 445 is then constructed by concatenating the two 4-character strings from the secret authorization and duress passwords yielding "mseenufn". The order of those digits is then optionally randomized a second time 450 by applying a randomization algorithm such as the Fisher-Yates shuffle (as described in FIG. 4(a), step 450) to produce the randomized challenge-passcode 455. The resulting challenge-passcode containing 8 alpha-numeric digits 465 is then displayed on the computing device's trusted display 460. The user will just enter the password characters (as described in FIG. 4(a), Step 475), ignoring and not entering the characters that are not part of the secret password they desire to use (i.e., ignoring either the secret authentication password characters or the secret duress password characters), depending on their intent to authorize or reject the transaction (as described in FIG. 4(a). All the remaining steps as described in FIG. 4(a) would remain the same for this embodiment.

The method disclosed herein for combining the dynamic numeric one-time random challenge in step 430 with the user's secret authentication and duress passwords in steps 435 and 440 respectively, then randomizing them in step 450 to be used in the user authentication process serves four security purposes; 1) it adds the ability for the user to enter a secret duress password without detection by an observer, thereby providing the capability to reject the transaction and/or trigger a "silent alarm" in a distress scenario, and 2) by adding a second round of randomization to the original dynamic challenge-passcode using random numbers generated by the device to create a confidential challenge-passcode that is only displayed on the computing device and never transmitted, thereby further increasing the MitM fraudster's work effort to launch a eavesdropping attack by requiring them to have a presence on the computing device (e.g., malware) in order to capture the secret password(s), 3) by randomly combining valid secret authentication password characters with duress password characters it obfuscates the secret passwords to an in-person eavesdropper observing the characters displayed on the computing device which further increases the fraudster's work effort to capture and decode the password(s), and 4) by using a maximum of 4 out of 5 possible characters from each secret password it increases the eavesdropping fraudster's work effort by making it impossible to capture the entire secret password while observing a single authentication sequence.

This embodiment may make it easier for some users to authenticate than the embodiment described in FIG. 4a for users who find it too challenging to convert the numeric digits to the corresponding secret password characters in their mind (as described in FIG. 4a step 475), however, this embodiment may be less secure because it requires the secret password characters to be stored and displayed on the computing device, making the password more susceptible to capture by fraudsters or malware.

FIG. 4(c) is a flow diagram illustrating an alternate embodiment to use the fingerprint reader present on many newer computing devices to enter the biometrically verified response to the challenge-passcode displayed on the computing device's trusted display using a fingerprint biometric method are described below. Steps 400 through 465 and step 490 are exactly the same as described in FIG. 4(a), however, in this embodiment step 475 is replaced and 480 is added as follows. The registered user employs the computing device's fingerprint sensor 480 to enter the secret password characters they have previously assigned to each finger (as described in FIG. 2(a,b), step 270b) in the correct order as they appear in the challenge-passcode on the trusted display affixed to the computing device by swiping or pressing on the computing device's fingerprint sensor 480 only the fingers corresponding to the four characters "e", "e", "m" and "s" in that order to enter the secret authorization password 475, thus completing the user biometric authentication process. All the remaining steps described in FIG. 4(a) would remain the same for this embodiment. It should be noted that by having the password characters assigned to fingerprints and combining them in a different order on each use, it effectively increases the security strength of the static physical biometric fingerprint to be nearly equivalent to that of a behavioral dynamic biometric. Furthermore, the ability to change the password character assigned to the fingerprint at any time minimizes the previously noted vulnerabilities associated with compromise of users' static physical biometrics.

It is understood that with reference to the embodiment described in FIG. 4(c), another embodiment that could utilize a similar method for authenticating to a numeric challenge-passcode using fingerprints, while quite possible and still within the scope of the present application, is not described herein but would be a less secure embodiment because the correlation of the numeric digits to the finger being used to enter them would be obvious to an in-person eavesdropper and would circumvent the obfuscation of the password third authentication factor provided by the previous embodiments, thereby reducing the security strength of such an authentication method.

FIG. 4(d) is a flow diagram illustrating another embodiment describing a method of authenticating a user utilizing multi-factor authentication plus a dynamic factor comprised of entering the biometrically verified response to the challenge-passcode using a Point of Interaction (POI) terminal by inserting a smart card with the secure-pay app installed. The user inserts their smart card 400 into a Point of Interaction (POI) device 410 (e.g., a touch screen credit card terminal) which is connected over the network to the remote authentication system, and the smart card exchanges transaction data 415 with the POI device. This embodiment then follows steps 417 through 465 and step 490 (as described in FIG. 4(a)) with steps 470 and 475 replaced as follows: The user 470 would then enter the challenge-passcode characters (as described in FIG. 4(a), step 465) by drawing them 475 on the touch-screen or touch-pad 460 affixed to the POI device 410 using their finger or a drawing device such as a stylus, and the secure-pay app on the smart card would validate the characters against the user's biometric handwriting minutiae stored on the smart card (as described in FIG. 2(a,b)). The remaining steps 485 through 490 (as described in FIG. 4(a)) would remain the same for this embodiment.

Optionally, in further embodiments there are many transaction scenarios where an additional independent authentication factor could be added to the disclosed system and method such as by utilizing a Global Positioning System (GPS) signal, if available on the computing device, or some other network location service known to those skilled in the art to identify the physical location of the user during the authentication process (as described in FIG. 4) to calculate the user's proximity to the physical location of the merchant or other relying party to the transaction, thereby adding an additional authentication factor consisting of "where you are" to further increase the trustworthiness of the authentication. However, it should be noted that the embodiments may utilize the dynamic challenge-response as the fourth authentication factor instead of the GPS location factor because that method is limited by the requirement for the computing device to have a GPS receiver and be outdoors in order to receive a satellite signal, and therefore is not considered practical for indoor use.

In a further embodiment, more than one biometric input technology (e.g., motion detectors, fingerprint sensors, touch-screens) may be supported by the user's computing device, in which case the user could select their preferred method using configuration settings on the secure-pay app.

These disclosed embodiments are intended to be illustrative only and not limiting and it is to be understood that other technologies can be used as the biometric sensors, and other methods or combination of methods known to those skilled in the art or invented or adapted in the future could be used.

FIG. 5 is a flow diagram illustrating an embodiment for using the secure-pay app installed on the computing device (as described in FIG. 1) registered to the user and equipped with a trusted camera and biometric sensor(s) (as described in FIG. 4(a-d)) to authenticate a user with the disclosed system and method to carry out a purchase or perform other financial transactions. By way of example this embodiment illustrates a purchase of merchandise in a brick-and-mortar store, but the disclosed method could be used for any in-person, on-line or virtual transaction requiring a financial payment or exchange of asset value. First the user selects the merchandise they wish to purchase 506 from a merchant who scans the price barcodes on the merchandise or manually enters the merchandise prices or otherwise enters the purchased items into their Point Of Interaction (POI) terminal 508 with a display screen accessible to the user (e.g. cash register, tablet computer, credit card swipe terminal, printed receipt) which initiates an electronic transaction (e.g., payment request) 510 to be paid by the user. The POI terminal displays a machine-readable code such as Quick Response (QR) code 512 generated using a standards-based format (e.g., Short Payment Descriptor (SPAYD) format) containing transaction data such as:

Merchant's Settlement Account (e.g., IBAN (International Bank Account Number),
BIC (Bank Identifier Code));
Store ID;
Terminal ID;
Sales associate ID;
Date and time stamp;
Unique transaction ID;
Invoice amount;
Payment currency;
Attributes and flags (e.g., sender's reference, recipient's name and address, payment due-date, tipping policy, checksum, message for recipient).

Using their computing device 500 that has the secure-pay app 502 installed (as described in FIG. 1) the user initiates the electronic payment transaction 514 by scanning the machine-readable code 512 displayed on the POI terminal 508 using the registered computing device's trusted camera, which constitutes an optical air-gapped data transfer which represents the first Out Of Band (OOB) channel in the communication chain, thereby thwarting electronic eavesdropping, card skimming and/or network MitM attacks. As an alternate method, the transaction data can be transferred using proximity-based (i.e., short range) radio frequency technology (e.g., Near Field Communication (NFC), Bluetooth, Wi-Fi) if supported by the registered computing device and the merchant's POI terminal. The user then selects a payment method and/or payment account displayed by the secure-pay app 515 from the list of available payment credentials enrolled on the computing device (as described in FIG. 3). An optional feature could be included in the secure-pay app to automatically perform step 515 without the user needing to manually select an account for each transaction if the user has previously selected a default account to associate with a particular merchant, (e.g., a debit card assigned to a grocery store, a store's gift card assigned to the issuing store, a mileage club credit card assigned to the airline, a department store issued credit card assigned to the issuing department store).

The secure-pay app then sends the registered computing device's device-ID token 516 to the remote authentication system via the external interface affixed to the computing device and connected to the network. The remote authentication system then uses the device-ID to look up the long-term shared-secret encryption key-derivation key (as described in FIG. 1) in the device registration database. The remote authentication system then optionally sends a random nonce and uses IKE2, or DUKPT as described in ANSI X9.24, or some similar key exchange protocol to agree on a unique session encryption key generated from the random nonce and the shared-secret encryption key-derivation key, and then establishes an encrypted session 517 between the remote authentication system and the computing device over the wireless data channel (e.g., cellular, Wi-Fi) of the computing device, which represents another out-of-band channel in the communications path, thereby avoiding transmission of the user's payment credentials for processing by the merchants' insecure networks and systems. It should be noted that in locations where no cellular network is available (e.g., out of range of a cell tower, on airplanes while in flight) the merchant may need to provide a local open Wi-Fi access-point, such as in the case of airlines that provide Wi-Fi to passengers at extra cost they could open only the URL(s) on their Wi-Fi router necessary to access the remote authentication system's gateway(s) at no cost, in order to provide the secure-pay app the network access necessary to authenticate purchases in-flight.

The secure-pay app 502 then prepares the payment request 518 containing data elements necessary to process the transaction such as:
   the registered user-ID token (as described in FIG. 1 step 140-1);
   the payment account token (as described in FIG. 3 step 380) for the registered payment account credential which the user selected in step 515;
   the transaction details captured from the QR code in step 512, and;
   a keyed-hash Hashed Message Authentication Code (HMAC) of the above transaction details.

Subsequently, the secure-pay app 502 then transmits the payment request described above to the remote authentication system via the encrypted wireless session (as described in steps 516-517).

The remote authentication system then independently calculates the keyed-hash HMAC of the transaction described in step 518 and compares it to the HMAC received from the computing device to verify the authenticity and integrity of the data to validate it has not been altered or tampered with in transit. The remote authentication system then sends verification requests 520 over the e-commerce network to the merchant to validate that the details of the purchase transaction are identical to the transaction data received from the user's computing device. The remote authentication system relays the payment request described in step 520 received from the user in 518 to the financial institution to verify the user's account details using the payment credential such as an EMV token (as described in FIG. 3 step 380) and requests payment authorization. The merchant confirms the purchase transaction details 522 and replies with a message to the remote authentication system verifying the transaction and providing a unique merchant confirmation code of arbitrary length for that transaction.

The financial institution also verifies the validity of the user's account credentials and account details and verifies availability of either sufficient credit or funds on deposit to cover the transaction, then responds to the remote authentication system with an approval 526 and optionally places a temporary hold on the funds/credit while the transaction is pending. If the financial institution denies the transaction the remote authentication system relays the denial message 548 to the user's computing device over the encrypted communications channel and the user's computing device 500 displays the denial message 550 and the transaction ends without success. If the financial institution approves the transaction the remote authentication system then creates the dynamic numeric one-time random challenge using methods such as Dynamic Passcode Authentication (DPA) 540 (as described in FIG. 4(*a-d*), step 425) and creates a message containing the numeric one-time random challenge along with a keyed-hash HMAC for the numeric one-time random challenge and transmits the dynamic numeric one-time random challenge and its HMAC back to the secure-pay app 502 on user's registered computing device 500 over the encrypted session established on the wireless data channel (as described in steps 516-517), it being understood that steps 520 through 540 may be performed simultaneously (e.g., in parallel) to improve the remote authentication system's processing and response time. The secure-pay app 502 then receives the dynamic numeric one-time random challenge and independently calculates the HMAC of the numeric one-time random challenge (as described in step 540) and compares it to the one transmitted from the remote authentication system to verify the integrity of the one-time challenge to ensure it has not been altered or tampered with in transit. The secure-pay app 502 calculates and displays the random one-time challenge-passcode 542 (as described in FIG. 4(*a-d*)), steps 430 through 455) and the user responds to the challenge-passcode 544 with the user authentication process (as described in FIG. 4(*a-d*) steps 460 through 485). Upon successful authentication by the user the secure-pay app 502 constructs a challenge-response message with data such as the following:
   the registered user-ID token (as described in FIG. 1 step 140-1);
   the registered device-ID token (as described in FIG. 1 step 165);
   the EMV token credential (as described in FIG. 3 step 380) for the enrolled payment account which the user selected in step 515;
   the successful authentication challenge-response (as described in FIG. 4(*a-d*), step 490);
   the dynamic numeric one-time random challenge;
   the transaction details captured from the QR code in step 512, and;
   a keyed-hash HMAC of the above transaction details.

The secure-pay app then transmits the above described data in a message 545 to the remote authentication system over the encrypted wireless session (as described in steps 516 and 517). The remote authentication system uses the same algorithm (as described in FIG. 4(*a-d*), steps 425 through 445) to independently reconstruct the hashed challenge-response using the digital signature 2-tuples on file in the user registration database and compares that hash to the hashed challenge-response received from the user 546 to validate that successful user authentication occurred.

An operational purpose of sending the dynamic numeric one-time random challenge and the original transaction data back to the remote authentication system is to enable a "stateless" process so that the remote authentication system does not have to store the dynamic numeric one-time random challenge and transaction details while awaiting completion of the user authentication process (as described in FIG. 4), and the HMAC process described in step 546 ensures the integrity of the transaction data and the dynamic numeric one-time random challenge in transit to support this "stateless" process. The financial institution then verifies the completion of the payment transaction and generates a unique confirmation code for the transaction and sends the confirmation code and payment settlement details 552 to the remote authentication system. The remote authentication system then concatenates the merchant's confirmation code generated in step 522 to the financial institution's confirmation code received in step 552 and relays this combined confirmation code 554 to the secure-pay app 502 on the user's registered computing device 500, and simultaneously sends settlement details and the combined merchant and financial institution's confirmation codes to the merchant who displays the transaction approval and confirmation codes on their POI terminal 558, while the user's secure-pay app 502 also displays the confirmation codes 560 on the registered computing device's display screen, where optionally the user and/or the merchant can visually verify that the final confirmation codes on the POI terminal 512 and the secure-pay app 502 on the registered computing device 500 match, thereby confirming the completion of the payment process and accomplishing a three-way mutual authentication process verifying the authenticity of all parties to the transaction.

Alternatively, in the case where no wireless signal is available to connect to the remote authentication system to conduct the transaction, the secure-pay app could complete the authentication process internally on the computing device and display the merchant confirmation code (in lieu of steps 545 through 558) to allow the merchant to validate that the transaction completed and is queued by the secure-pay app using the "store and forward" technique and will be transmitted the next time the computing device is able to connect to the remote authentication system over the network, thereby providing off-line authentication. Optionally, the financial institution and/or the remote authentication system can also send an e-mail with a receipt to the user's registered computing device or other e-mail system to create a permanent record of the transaction, which allows the user to validate the transaction details and to provide a paperless receipt which would optionally allow the user to print a paper copy at a later time if needed. The merchant then releases the merchandise to the user 562 and the transaction ends successfully.

In a further embodiment, the secure-pay app could be implemented on a smart-watch equipped with NFC capability to capture the transaction data from a merchant's NFC equipped POI (as described in FIG. 5 step 514), and the user could then wave their hand in the air and draw the secret password characters to complete the authentication process (as described in FIG. 4a step 475).

In a further embodiment, when the remote authentication system's settlement process completes a payment authorization and e-mails the receipt with the transaction details along with the confirmation code (as described in FIG. 5 step 552), the secure-pay app then compares the confirmation code contained in the e-mail to the log of transactions that have been authenticated by the user using the secure-pay app on the registered computing device and alert the user with a warning sound and message if there is no matching transaction (i.e., a fraudulent transaction was processed that the user did not authorize using the secure-pay app on the registered computing device). A security purpose of this feature would be to provide automated, near real-time fraud detection and alerting in the event a fraudster launches an attack or somehow compromises other components of the e-commerce system (e.g., the merchant's system, the remote authentication system, the financial institution's system) and successfully counterfeits a transaction.

In a further embodiment, including a scenario such as a restaurant where a server could carry a printed bill with the QR code containing the transaction details on it to the user's table, the user then scans the QR code at the table using the secure-pay app, which may also display recommended tip amounts for the user to select, then the user completes the authentication and payment process (as described in FIG. 5). The combined merchant and financial institution confirmation code is then displayed by the secure-pay app on the registered computing device, which the server can then compare the confirmation code displayed (as described in FIG. 5 step 554) with the merchant's confirmation code that may be printed on the merchant's copy of the receipt retained by the server in order to verify that the payment process completed successfully and the bill was paid. At the option of the merchant, the confirmation code could be static (e.g. always the same for each merchant, each merchant's location, each merchant's location and POI terminal, each server), or it could change daily, or it could be unique for each transaction depending on the risk acceptance policy of the merchant. An advantage of this method is that the successful approval of the payment can be verified immediately at the table without the employee having to walk back to the merchant's POI terminal with a payment card and then return to the table to complete the transaction, thereby protecting the users' payment card from potential surreptitious activity while out of their possession. Another advantage of this method is that it saves the time and effort for multiple trips to the POI terminal for the server, thereby reducing the merchants' labor costs. Another advantage of this method is that it allows the user to leave the restaurant immediately upon completion of authentication and payment processing at the table, thereby increasing convenience and saving the user time.

In a further embodiment, in a scenario such as a restaurant with a drive-through lane where there is a speaker and a screen for taking orders before arriving at the window, when the order is complete the ordering screen could display the QR code for the amount due and the user could scan it with the secure-pay app and pay for the meal (as described in FIG. 5), thereby increasing convenience and saving time for the user and labor cost for the merchant by allowing the user to skip the payment window before proceeding to the pick-up window. In a further embodiment, in a scenario with a merchant such as a mobile vendor (e.g., a roaming beer or hot-dog vendor at a stadium, a food truck vendor, an ice-cream truck, a Girl Scout selling cookies) where the merchandise prices are fixed, a static QR code could be displayed for each item and the user could scan the QR code(s) for the item(s) they wish to purchase using the secure-pay app and complete the authentication and purchase process (as described in FIG. 5). The confirmation codes would then displayed on the registered computing device and the vendor could visually compare the merchant's confirmation code displayed on the secure-pay app to their merchant's confirmation code (as described in FIG. 5 step 560) which would be known only to the vendor, allowing them to immediately verify that the authentication and payment process completed successfully, whereby approval of the payment can be verified by the vendor on the spot without the need to have any network access, POI device or credit card terminal at all. Another use-case where there is no fixed-price menu such as a Salvation Army kettle, a QR code could be affixed that allows the user to enter any amount they wish to donate into the secure-pay app.

In a further embodiment, in the scenario currently employing parking meters or parking kiosks that print payment receipts to display in the windshield or ones requiring you to enter the vehicle tag number to an on-line service, static QR codes with the merchant ID and a unique ID for each meter could be displayed at the parking space with a unique identification number for that parking space with different QR codes for different amounts based on length of stay (e.g., ½ hour, 1 hour, 2 hours, 4 hours), the user could scan the appropriate QR code and authorize payment (as described in FIG. 5). Then the user could write the confirmation code displayed by the secure-pay app (as described in FIG. 5 step 560) on a piece of paper to leave on the dashboard visible through the windshield where a parking enforcement agent could then enter the confirmation code into their mobile parking app to verify that the parking fee has been paid, or in another embodiment where a paper copy is not required the parking enforcement agent could then enter the parking space number into their mobile parking app to verify that the parking fee has been paid, and optionally the parking app could display an alert when the parking payment period for a parking space expires. This would also improve revenues from parking meters because under the current system when a vehicle vacates a space with time left on the meter the next motorist can piggy-back and get free parking for the duration of that time, whereas under the disclosed method the next motorist would have no way of knowing if the confirmation code had time left on it and would have to pay the full parking fee.

In a further embodiment, gasoline pumps could display a QR code on the payment screen or print one on-demand using the receipt printer, and the user could scan the QR code to authorize payment (as described in FIG. 5). This system and method would be compatible with existing hardware and infrastructure, and unlike existing payment card systems could be implemented without even requiring a payment-card reader, a screen or a keyboard installed on the pump by having a static QR code for each gasoline grade dispensed by the pump.

In a further embodiment, queueing registration stations (e.g., take-a-number machines, check-in kiosks) such as at doctor's offices, merchandise pick-up counters, or pharmacy counters could have a QR code displayed with the merchant's identity information and the user could register for their turn in line by using the secure-pay app. In an example scenario such as prescription pick-up at a pharmacy, the remote authentication system could even supply the user's identity information such as their name and date-of-birth which is necessary to pick up the prescriptions from the merchant with higher-assurance and privacy than verbally asking the user for their private information in public at the register.

In a further embodiment, a QR code could be displayed on turnstiles at locations like airport boarding gates where the secure-pay app could be used to transmit the user's credentials to the airline reservation system and prove the user's identity using multi-factor authentication to quickly verify their identity and the fact that they possess a valid reservation all in one operation without requiring a paper boarding pass or photo identification (e.g., passport).

In a further embodiment, the secure-pay app could have a feature where the user could generate and display a QR code on the registered computing device's display screen for a transaction they enter using the keyboard that could then be scanned and paid (as described in FIG. 4(*a-d*)) by another device with the secure-pay app installed, thereby enabling direct person-to-person (P2P) or device-to-device payments. This feature can be used for a number of use-cases including replacing small merchant computing device payment processing systems (e.g. Square, GoPayment, PayPal Here) that require a payment-card reader connected to the computing device. It would also enable direct person-to-person payments by non-merchants for things such as babysitting and lawn-mowing services and personal item purchases in venues such as Craigslist, yard-sales, flea markets and the like. For transactions between individuals without a merchant account, the secure-pay app would have a feature to enable either party to the transaction to pay the transaction fee, or split it between them in an agreed percentage. The secure-pay app could have another user-selectable option which could allow the parties to agree that the transaction is non-refundable, such as for clearance merchandise where all sales are final, or for items sold on an "as is" or "no warranty" basis, thereby enabling "same as cash" transactions.

In a further embodiment, the secure-pay app could have a feature where the user could generate a QR code on the registered computing device and e-mail it to another user that has the secure-pay app installed on their computing device to initiate a funds transfer, and the receiving user could authenticate to authorize the remote authentication system to perform the transaction. The capability to make P2P payments (e.g., Zelle, PopMoney, PayPal, Venmo) can be used for a number of remote payment use-cases such as parents transferring money to their children's accounts (e.g., when they are away at school), paying rent to landlords using split transactions from multiple roommates, charitable organizations soliciting donations, etc.

In a further embodiment, payment for merchandise sent requiring "Cash On Delivery" (COD) could be paid by the user at the time of delivery if the merchant affixed a QR code to the package with the transaction details for the cost of the merchandise and delivery fees, thereby allowing the user to scan the QR code and complete the payment process (as described in FIG. 5), and the delivery agent (e.g., Amazon, USPS, UPS, FedEx) could optionally visually compare the confirmation code displayed on the users' secure-pay app to a merchant's confirmation code printed on their delivery receipt (as described in FIG. 5 step 560) to confirm the payment transaction has been successfully completed and approved before releasing the package.

In a further embodiment, payment of paper bills or invoices could be made using the secure-pay app if the biller prints a QR code on the bill containing the payment transaction details (as described in FIG. 5). The QR code could be scanned with the secure-pay app, then the user could choose which payment account credential to use, or optionally the app would use a default credential they previously set for that biller. Then the user would select whether to pay the entire bill amount or make a partial payment, for instance pay one month or quarterly for recurring services, or pay just the minimum payment due such as on a credit card account, or just pay the past due amount, or manually enter any other arbitrary amount. The app could optionally display the payment due date as contained in the QR code transaction details, and optionally allow the user to specify a different payment date; such as pay the bill immediately, or elect to pay it on some future date other than the due date. The user would then authenticate the payment (as described in FIG. 4(*a-d*)) and the biller would receive payment to their account from the remote authentication system (as described in FIG. 5). Optionally, in order to provide a convenient method to save the user time and effort, the secure-pay app could have a "batch mode" where the user could authenticate only once (as described in FIG. 4(*a-d*)) then pay a plurality of bills by scanning the QR codes one right after the other, then terminate the "batch mode" when they are finished paying all their bills.

A further embodiment could permit a user's computing device to authenticate the user in order to log-on to web-based or client-server systems such as on-line banking applications, brokerage accounts (e.g., eTrade, Fidelity), e-commerce shopping sites (e.g., Amazon, eBay), or the like, or log-on to any secure system that requires trustworthy authentication in order to protect financial transactions or other assets. By utilizing a web-based log-in screen interfaced to the remote authentication system, the user can scan a log-in QR code displayed on the screen containing details such as the owner (Merchant ID), the location (Domain ID), the terminal number (Web-page ID), the date and time, and a sequential transaction number with the users' computing device trusted camera. Then the secure-pay app transmits the authentication request to the remote authentications server and the user's account credentials and one-time challenge-passcode are exchanged with the authentication system and the user completes the authentication process (as described in FIG. 4(a-d)), then the computing device or browser would acknowledge successful log-in by automatically redirecting to a page such as the logged-in user's account profile page, thereby providing high-assurance multi-factor authentication to replace less secure legacy single-factor username and password log-in or two-step SMS text generators or one-time password hardware tokens or the like in the on-line e-commerce environment.

In a further embodiment the invention could allow a user's computing device with the secure-pay app installed to authenticate the user and permit access to an e-commerce network connected device such as an ATM machine. The ATM would display a specially constructed unique log-in QR code on the screen containing details such as; the owner (e.g., bank ID), the location (e.g., building ID), the terminal number (e.g., ATM ID), the date and time, and a sequential transaction number, and alternately the dynamic numeric one-time random challenge. The user would scan the QR code displayed on the screen with the computing device's trusted camera using the secure-pay app, then optionally select the account they wish to use for the transaction, and then authenticate themselves (as described in FIG. 4(a-d)). The remote authentication system would transmit the successful authentication message along with the user's account credentials for that financial institution over the e-commerce network to the ATM, which would then display the normal user interface screen and proceed with the transaction. This high-assurance multi-factor authentication process would replace the less secure legacy two-factor payment card swipe and PIN number entry. In addition, it could also add additional security functionality, such as in the event of criminal activity the user could authenticate using their secret duress password which could deny or limit the cash withdrawal and initiate a silent alarm to law enforcement personnel that a crime is in progress. Also, this embodiment could also avoid the cost of upgrading older ATMs with chip and PIN payment card readers.

A further embodiment could allow a user's computing device with the secure-pay app installed to authenticate the user to access the user's virtual currency exchange to conduct trading transactions. Another alternative embodiment would be to use the secure-pay app to access a password wallet that secures their virtual currency account's private key used to access their account.

A further embodiment could allow a user's computing device with the secure-pay app installed to authenticate the user to permit use of store loyalty club accounts. The secure-pay app could alternatively contain the users' loyalty club membership credentials that enable club membership benefits such as club discounts or points accumulation, and eliminate the additional step of scanning the merchant's loyalty club card by automatically sending the credentials to the merchant when payment is made using the secure-pay app. Another use-case for this capability would be authentication for admission to airport lounges reserved for frequent flyer club members. Authentication for this embodiment which currently does not require full three-factor authentication (e.g., biometrics), could be satisfied by possession of the user's registered computing device plus the club membership credentials registered to the user which would exceed the single-factor authentication (e.g., possession of a membership card) typically required by such loyalty clubs, thereby requiring only capture of the QR code for the secure-pay app on the registered computing device to transmit the loyalty club credentials to the merchant. In this embodiment the secure-pay app could serve as an electronic wallet to carry the all the user's loyalty club memberships without the need to carry multiple membership cards or separately enter the user's ID (e.g., phone number) for each transaction.

In a further embodiment the disclosed authentication method could detect impaired behavior in the handwriting signature recognition process such that the secure-pay app could determine if the user was not sober, thereby providing a method for denying access (e.g., for vehicle ignition systems).

In a further embodiment the secure-pay app could be used to authenticate to a QR code on another app, for instance one installed on a law enforcement officer's mobile device, that could be used to look up the user's driver's license (e.g., digital driver's license) on the state motor vehicle agency's database to display the license, thereby providing access to the license data in the event the user does not have the physical license in their possession, as well as providing biometric protection against a counterfeit license or a license that has been borrowed or stolen from someone who looks like the user.

In a further embodiment, the secure-pay app authentication method could be used to verify the age of a buyer to the merchant when purchasing alcohol, tobacco or other age restricted merchandise where, a merchant such as a store, a bar or a restaurant could have an app on their computing device that displays a QR code with the merchant account information which the user could scan with the secure-pay app and authenticate, which would then look up the user's age and other relevant information from verified sources (e.g., digital driver's license) and display it on the merchant's app.

In a further embodiment the authentication method could optionally be used with a random nonce internally generated by the computing device to unlock the device itself (as described in FIG. 4(a-d)) by authenticating using the dynamic challenge combined with the biometric digital-signature 2-tuples associated with the user's secret password characters. The benefit to the user is that any data present on the device can be secured at a higher level than with the default device unlocking method (e.g., static password, PIN, biometric only), and could possibly provide increased privacy protection if the user is required to provide biometrics to unlock their device by the government since disclosing passwords may be protected by the Fifth Amendment.

Additional embodiments where the trustworthy authentication provided by the secure-pay app could be employed include but are not limited to:

Trustworthy electronic voting applications such as where the user has registered by appearing in-person or using other approved means for identity verification, and has also registered their biometric digital signatures as disclosed herein with the voter registration board.

A higher-assurance and more convenient alternative to the Completely Automated Public Turing test to tell Computers and Humans Apart (CAPTCHA) method that provides the 'I am not a robot' verification.

A method to verify with high-assurance the identity of the human owner of social media (e.g., Twitter, Instagram, Facebook, Snapchat) accounts to prevent account hijacking, and provide multi-factor authentication for user login to prevent false information from being posted on other users' accounts.

A high-assurance method to verify that 'likes', comments, product reviews and other feedback mechanisms on webpages such as social media and on-line vendors are genuine and come from a verified user, and optionally regulate them so that, for instance, each user can only submit a prescribed number of votes (e.g., for television show contestants), 'likes' or product reviews, and to verify that they are submitted by real human users rather than generated by computer bots, or by 'click-farms', where a large group of low-paid workers are hired to click on links for fraudsters that sell 'likes' and positive product reviews in order to artificially inflate social media and product review statistics to influence outcomes.

It is to be understood that these embodiments are intended to be illustrative only and not limiting and other methods or combination of methods known to those skilled in the art or invented or adapted in the future could be used. It is also understood that these descriptions can be implemented in various methods and systems and with various modifications but still fall within the scope of the appended claims. Those of ordinary skill in that art will recognize that other elements may be desirable and/or required in order to implement the present invention, however, because such elements are well known in the art and because they do not facilitate a better understanding of the present invention, a discussion of such elements is not provided here. The particulars shown herein are by way of example and for purposes of illustrative discussion of selected embodiments of the present disclosure only and are presented in the cause of providing what is believed to be the most useful and readily understood description of the principles and conceptual aspects. In this regard, no attempt is made to show details of the embodiments with more particularity than is necessary, the description taken with the drawings making apparent to those skilled in the art how the several forms of the present invention may be embodied in practice. It is to be understood that the drawings presented herewith only provide diagrammatic representations of presently preferred structures of the present invention and that structures falling within the scope of the present invention may include structures different than those shown in the drawings. It is also to be understood that these selected embodiments are intended to be illustrative only and not limiting and other embodiments to suit additional use-cases known now or invented or adapted in the future (e.g., blockchain, quantum encryption) could also be used.

While the system and method for authentication using a uniquely identifiable device plus one of a plurality of biometric identity factors plus a secret password combined with a dynamic random dynamic challenge number to create dynamic challenge-passcode herein as shown and described in detail is fully capable of attaining the benefits of the invention, it is to be understood that the embodiments of the invention are thus representative of the subject matter which is broadly contemplated by the present invention, that the scope of the present invention fully encompasses other embodiments, and that it be understood that the claims are intended to define the spirit and scope of this invention. The invention described herein is intended to cover the method, system or apparatus and the related programs encoded on a tangible processor readable medium.

GLOSSARY

The terms, systems and methods described in the disclosure include the following terms and their exemplary definitions:

AIR-GAPPED COMMUNICATIONS CHANNEL: The use of an optical Quick Recognition (QR) Code using the Short Payment Descriptor (SPAYD) protocol that can be captured by the trusted camera in a mobile device, or the use of a Near Field Communications (NFC) enabled computing device which enables passing the purchase transaction data from the merchant's system to the user's computing device without transmission over the wide-area network in such a way that a fraudster would also have to be physically present at the time and location of the transaction to be able to intercept the out-of-band raw transaction data before it is encrypted by the computing device for transmission to the remote authentication system.

BIOMETRICS: Measurable physical characteristics or personal behavioral traits used to identify, or verify the claimed identity of, an individual. Biometrics are divided into two general classes; physiological or behavioral. Physiological or static physical biometrics include facial images, fingerprints, handwriting samples, skin texture analysis, ear prints/images, palm prints/images, finger vascular pattern (veins) detection, iris recognition, face recognition, hand geometry, DNA, etc. Behavioral or dynamic biometrics include handwriting gesture recognition, walking gait, continuous user identification via touch and movement behavior, eye movement tracking, voice recognition, keystroke dynamics, physiological (e.g., measuring pulse, heart rate and respiration), cognitive (e.g., measuring stylometry of writing and speech), measuring browsing habits and device and application use, etc.

BIOMETRIC DIGITAL-SIGNATURE: Cryptographic transforms of biometric data collected from a user through the use of mathematical principles that can authenticate the user to levels approaching mathematical certainty.

CHALLENGE-RESPONSE PROTOCOL: As defined in NIST SP 800-63-3, an authentication protocol where the verifier sends the claimant (e.g., user) a challenge (usually a random value) that the claimant combines with a secret (e.g., hashing the challenge and a shared secret together, applying a private key operation to the challenge, optionally combining the challenge with other data known to the claimant) to generate a response that is sent to the verifier.

COMPUTING DEVICE: Any device or combination of devices, such as a processor capable of executing cryptographic algorithms or machine-readable instructions that has the hardware, such as motion or fingerprint sensors, that is connected to a communications link for coupling and enabling the transactions between user, applications and authentication services to support the systems and methods disclosed herein. The most prevalent computing device that is possessed by users and available for completing e-commerce transactions is a smart-phone (e.g., cell phone, mobile phone), but any other device or combination of devices equipped with the required hardware such as tablets, digital watches, notebook computers, smart cards or any other computing devices now in existence or invented in the future could be used. The term "mobile device" is not intended to be limiting, any computing device with the proper hardware could be used, e.g., a desktop computer with a touch pad or fingerprint scanner installed could be used. Throughout this disclosure the terms MOBILE DEVICE and COMPUTING DEVICE are used interchangeably.

CREDENTIAL STORAGE: A method, or combination of methods, for providing data security for the computing device's long-term storage media (e.g., hard disk, flash memory) to protect the confidentiality of sensitive data (e.g., device-IDs, user-IDs, encryption keys, key-derivation keys, biometric minutiae, biometric digital-signatures, biometric digital-signature 2-tuples, payment credential tokens).

DIGITAL CHAIN OF TRUST: An electronic security framework which includes trusted identity authentication, trusted information integrity, trusted digital receipts, and trusted access that establishes the necessary trust standards to acceptably mitigate each risk; to ensure the legal enforceability of electronic acts; to generate forensic evidence; and to provide audit metrics for operational compliance.

DYNAMIC CHALLENGE-RESPONSE: In computer security "challenge-response authentication" is a family of protocols that employ dynamic randomly generated one-time challenge (e.g., Dynamic Passcode Authentication (DPA)), where knowledge of one authenticator does not assist in deriving a subsequent one-time authenticator, in which the verifier presents a question ("challenge") and the user must provide a valid answer ("response") in order to be successfully authenticated.

ENCRYPTED SESSION: An encrypted network tunnel established using methods such as the Diffie-Hellman Internet Key Exchange (IKE) method using an encryption key generated using a shared-secret key-derivation key to create symmetric session encryption keys for confidentially exchanging the transaction data between the computing device and the remote authentication system over untrusted networks.

ENTROPY: The relative degree of randomness which increases the work factor for an adversary to replicate a result through brute force or cryptanalysis methods. For the purpose of generating random numbers with a high degree of randomness in accordance with the teachings of the present application, the authentication process of the remote authentication system (aka, Trusted Middleman) which is residing on a server in the network infrastructure and connected remotely to the device requesting authentication, generates true random integer of n digits (the number of digits in the integer n is defined by the remote authentication system's security policy) by using a commercially available hardware-based high-rate, high-availability, full entropy random number generator (e.g., QStream by Quintessence Labs, GRANGE Server by L.E. Tech).

HMAC: A Hashed Message Authentication Code compliant with the IETF RFC 2104 entitled "HMAC: Keyed-Hashing for Message Authentication" published February 1997.

IDENTITY PROOFING: The process of providing sufficient information (e.g., identity history, credentials, documents) to a Registration Authority (e.g., credential service provider) for the purpose of proving that a person or object is the same person or object it claims to be, thereby allowing the Registration Authority to make an assertion of the entity's identification at a useful level of assurance to support future authentications that require high assurance of a claimant's identity.

KEY-DERIVATION KEY: A unique key, e.g., an immutable key derived using a computing device's unclonable device-unique hardware identifier, that can be shared with another entity (e.g., a remote authentication system) in secret (i.e. a long-term shared-secret), that the parties can then use to derive ephemeral symmetrical encryption keys (e.g., session keys) that can be used for cryptographic security to protect the confidentiality and integrity of data transmitted between the parties. Also known as a Cryptographic Ignition Key (CIK).

MOBILE DEVICE: See COMPUTING DEVICE.

MOBILE DEVICE SECURITY ELEMENT (SE): By providing, for instance, two virtual processors backed by hardware and software enforced process separation and access control, the mobile device's Central Processing Unit (CPU) lets the application core switch between two states; secure and non-secure, in order to prevent information from leaking from the more trusted process to the less trusted process. Through a trusted monitor (hypervisor), memory and peripherals are aware of the operating state of the core and use this to provide hardware enforced access control to protect data and application code on the device so it cannot be compromised by non-secure processes. The term MOBILE DEVICE SECURITY ELEMENT can also include alternate security architectures used by various vendors (e.g., Nokia, Microsoft) that utilize a discrete Trusted Platform Module (TPM) chip that provides hardware enforced security functions.

MOTION SENSOR: Hardware in the mobile device such as accelerometers, gyroscopes, g-meters and geomagnetic sensors capable of detecting changes on all three axes such as pitch, yaw, Coriolis force, and angular rates of change that make it possible to track and capture complete movements in a three-dimensional space.

MULTI-FACTOR AUTHENTICATION: Using a plurality of the factors for authentication as defined in NIST SP 800-63-3 which are;

Something Only the User Knows (e.g., secret password(s))

Something Only the User Has (authenticated device, e.g., mobile phone),

Something Only the User Is (biometrics, e.g., handwriting patterns, fingerprints, iris patterns, typing patterns, voiceprints)

A challenge sent by the verifier that the user combines with another factor (e.g., something the user has) to generate a response that the verifier can associate with the user MUTUAL AUTHENTICATION: Mutual authentication between the user (consumer), the merchant (relying party), the remote authentication system (trusted key escrow agent, trusted middleman), and the financial institution (financial institution), which provides resistance to Man-In-The-Middle (MitM) and Man in the Browser (MitB) attacks and/or URL redirection attacks or where one of the on-line parties is dishonest.

OUT-OF-BAND (OOB) COMMUNICATIONS CHANNELS: A method of utilizing multiple independent data transmission channels such as; the optical QR code trusted camera capture, the user's mobile wireless transmission, the merchant's business network, and visual observation of the user entering biometrics or their secret password to complete the authentication transaction, thereby making it infeasible to compromise authentication with a MitM attack unless the attacker has the ability to monitor all the OOB channels simultaneously. PERFECT SECRECY: In Shannon's proof of security, the "perfect secrecy" of the one-time-pad requires four properties: 1) truly random (as opposed to pseudorandom) one-time-pad values, 2) secure generation and exchange of the one-time-pad values because the security of the one-time-pad is only as secure as the security of the one-time-pad exchange, and 3) the one-time-pad must be as large as the plaintext it is used to encrypt, and 4) the one-time-pad must have careful treatment to make sure that it continues to remain secret, and is disposed of correctly preventing any reuse in whole or part—hence "one-time".

POINT OF INTERACTION (POI) TERMINAL: (Also known as payment card terminals or credit card terminals). Hardware and/or software in point of sale equipment (e.g. a magnetic stripe card reader, chip-and-PIN card reader) that enables a user to use a payment card to make a purchase at a merchant. Newer POI systems may be designed to allow items other than payment cards to be used to make payments (e.g. mobile phones).

QUICK RESPONSE (QR) CODE: Barcodes conforming to the open standard QR Bill™ Code User Payment Guidelines published by the Electronic Payments Association's Council for Electronic Billing (CEBP), the European Union Short Payment Descriptor (SPAYD) format, or other applicable open, government or industry standards.

REMOTE AUTHENTICATION SYSTEM: A system such as a payment gateway operator or third-party middleman, accessible remotely over the wide-area-network communicatively coupled with the user's computing device that serves as the trusted escrow agent (e.g., trusted middleman) for registering the verified user, the user-ID token, the device-ID token, the long-term shared-secret encryption key-derivation key, and payment credential tokens in order to use those identity factors and others to authenticate the user to facilitate secure transaction processing between users, relying parties and financial institutions.

SECURE-PAY APPLICATION (AKA secure-pay app): The application disclosed herein which simplifies multi-factor authentication to secure transaction processing over a network (e.g., the Internet) using mobile or other computing devices in the e-commerce environment.

STATELESS PROCESSING: A method for managing multi-step payment transactions whereby the remote authentication system does not store the intermediate data while the transaction is pending completion by the claimant, but instead receives the data, looks it up, or recreates the data when the next step in the transaction is processed. This "stateless" processing architecture enables a more efficient use of computational resources.

TOKENIZED IDENTITY/PAYMENT CREDENTIALS: So as not to transmit complete and usable identity or account credentials over the untrusted Internet or wireless networks, and so as not to have them retained and stored on relying parties' (merchants') systems, user-IDs, account numbers and other personally identifiable information that are tokenized compliant with the Europay, MasterCard and Visa (EMV) or other standards.

TRUSTED ESCROW AGENT: THE REMOTE AUTHENTICATION SYSTEM, PAYMENT GATEWAY OPERATOR, OR THIRD-PARTY MIDDLEMAN THAT ACTS AS THE E-COMMERCE TRANSACTION BROKER BETWEEN THE USER, THE MERCHANT AND THE FINANCIAL INSTITUTION. THE REMOTE AUTHENTICATION SYSTEM SERVES AS THE TRUSTED ESCROW AGENT (E.G., TRUSTED MIDDLEMAN) FOR THE LONG-TERM SHARED-SECRET KEY-DERIVATION KEY, DEVICE-ID TOKEN, USER-ID TOKEN, AND PAYMENT CREDENTIAL TOKENS IN ORDER TO FACILITATE SECURE TRANSACTION PROCESSING BETWEEN THE PARTIES.

I claim:

1. A method for registering a computing device with at least one remote authentication system comprising;
    generating an immutable device-unique identity token for a computing device, whereby a first identity factor in a multi-factor authentication method is created;
    generating a device-unique shared-secret encryption key-derivation key using cryptographic operations on the device-unique identity token, whereby the key is cryptographically bound to the computing device;
    storing the device-unique encryption key-derivation key on a machine-readable information storage medium associated with the computing device;
    obtaining a high-entropy one-time-pad shared-secret symmetric encryption key from a remote authentication system;
    entering said one-time-pad encryption key manually into a trusted input mechanism associated with the computing device;
    encrypting at least the device-unique shared-secret encryption key-derivation key on the computing device using said one-time pad encryption key;
    transmitting the device-unique identity token and the encrypted device-unique shared-secret encryption key-derivation key to the remote authentication system over a network communicatively coupled to the computing device; and
    storing the received device-unique identity token and the device-unique shared-secret key-derivation key in a device registration database associated with the remote authentication system containing a plurality of records associated with (i.e., keyed with) each device's unique identity token where the association between said computing device and its encryption key-derivation key is registered with at least one remote authentication system, whereby a shared-secret key-derivation key to generate encryption keys for future communication sessions is provided.

2. The method of claim 1 wherein the immutable device-unique identity token for the computing device is generated by,
    identifying at least a near unique physically identifying hardware property of the computing device, and
    forming the immutable device-unique identity token by using cryptographic operations on the generally physically unique property of the computing device thereby cryptographically binding said identity token to the computing device's unique physically identifying properties, whereby it becomes exceedingly impractical for another computing device to impersonate said computing device.

3. The method of claim 1 wherein the high-entropy one-time pad shared-secret encryption key is of a length equal to or greater than the text to be encrypted, the text to be encrypted including at least the device-unique shared-secret encryption key-derivation key and the method includes,
    receiving said one-time-pad shared-secret encryption key from the remote authentication system via any out-of-band communications channel other than the network communicatively coupling the computing device to the remote authentication system.

4. The method of claim 3 wherein the high-entropy one-time-pad shared-secret encryption key is obtained from the remote authentication system via at least one of a telephone call, a fax, postal mail, a commercial delivery service or via electronic means on a device other than said computing device.

5. The method of claim 3 wherein the receiving of said one-time-pad shared-secret encryption key via an out-of-band communications channel prevents it from being eavesdropped on via the network communicatively coupling the computing device to the remote authentication system.

6. The method of claim 3 wherein the receiving of said one-time-pad shared-secret encryption key further includes,
destroying all copies of the high-entropy one-time-pad shared-secret encryption key after use, whereby information-theoretical perfect secrecy of the shared-secret data transmitted using it is provided.

7. The method of claim 1 further comprising:
verifying the correctness of the high-entropy one-time-pad shared-secret encryption key received from the remote authentication system during the manual entry of said key into the trusted input mechanism associated with the computing device.

8. The method of claim 7 wherein verifying the correctness of the high-entropy one-time-pad shared-secret encryption key is performed by calculating a check-sum after every sub-segment of characters of arbitrary length within said key during entry by using an algorithm.

9. The method of claim 8 wherein said algorithm is, or is equivalent to, Luhn mod N.

10. The method for registering a computing device of claim 1 wherein the method further register a user and their biometric identifiers with the remote authentication system, the method further comprising:
obtaining a unique user identity token from the remote authentication system;
obtaining values detected by trusted sensor mechanism(s) associated with the computing device to acquire biometric minutiae corresponding to each individual character of a secret password or passwords known to the user;
storing the biometric minutiae in a machine readable data storage mechanism associated with the computing device;
performing cryptographic operations on the biometric minutiae associated with each secret password character entered by the user in order to generate biometric digital-signatures for each of said password characters, whereby a combination of password characters and their associated biometric identifiers comprising the second and third factors in a multi-factor authentication method are created;
storing the unique user identity token and biometric minutiae with their corresponding biometric digital-signatures in a machine readable data storage mechanism associated with the computing device;
encrypting at least the user's biometric digital-signatures on the computing device using a portion of the high-entropy one-time-pad encryption key;
transmitting at least the unique user identity token and the user's encrypted biometric digital-signatures from the computing device to the remote authentication system over a network communicatively coupled to the computing device; and
storing the received user's unique identity token and the plurality of the user's biometric digital-signatures in a user registration database associated with the remote authentication system containing a plurality of records associated with (i.e., keyed with) each user's unique identity token where the association between the user and their biometric data is registered with at least one remote authentication system, whereby the user's biometric digital-signatures corresponding to their password characters facilitating their utilization as two user identity factors in future multi-factor authentication transactions with the remote authentication system is provided.

11. The method of claim 10 wherein the method further registers a unique user identity token and the associated user's verified identity details with the remote authentication system, the method further comprising:
performing identity proofing of the user by examination and verification of physical identity documents issued by third-parties or by verifying knowledge from the user only they would know to produce user identity data, thereby providing independent verification of the user's identity;
generating a unique user identity token on the remote authentication system for each user by cryptographically operating on some portion of the user's verified identity data to create cryptographic binding of the user identity token to the user's authenticated legal identity and identity details;
storing said user identity token with the user's legal identity details in a user registration database associated with the remote authentication system, whereby registration of the user identity token and the user's verified identity details with the remote authentication system is provided;
receiving said unique user identity token from the remote authentication system and entering it into the computing device;
storing said user identity token in the machine readable data storage associated with the computing device.

12. The method of claim 11 wherein a user's authorization to access accounts at financial institutions is registered with the remote authentication system by utilizing the user's unique identity token comprising:
obtaining the user's unique identity token from machine readable data storage of the computing device;
obtaining the user's financial account information by capturing an image of a payment card, account statement, QR code or other credential with the trusted camera or other input method associated with the computing device;
transmitting the user's unique identity token and the account information to the remote authentication system over a network communicatively coupled to the computing device;
transmitting the legal identity information associated with the user stored in the user registration database from the remote authentication system to the financial institution associated with the account; and
establishing the user's authorization to access said account by comparing the verified identity information received from the computing device via the remote authentication system with information on file at the financial institution, whereby protection from fraudulent use of an account belonging to another is provided.

* * * * *